US012659812B2

(12) United States Patent (10) Patent No.: US 12,659,812 B2
Li (45) Date of Patent: Jun. 16, 2026

(54) CALL DROP RATE REDUCTION METHOD AND TERMINAL

(71) Applicant: Honor Device Co., Ltd., Shenzhen (CN)

(72) Inventor: Haibo Li, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 351 days.

(21) Appl. No.: 18/571,646

(22) PCT Filed: Aug. 15, 2022

(86) PCT No.: PCT/CN2022/112510
§ 371 (c)(1),
(2) Date: Dec. 18, 2023

(87) PCT Pub. No.: WO2023/051060
PCT Pub. Date: Apr. 6, 2023

(65) Prior Publication Data
US 2024/0284266 A1 Aug. 22, 2024

(30) Foreign Application Priority Data

Sep. 29, 2021 (CN) .......................... 202111153780.X

(51) Int. Cl.
*H04W 36/00* (2009.01)
*H04W 36/14* (2009.01)
*H04W 76/38* (2018.01)
(52) U.S. Cl.
CPC ....... *H04W 36/0022* (2013.01); *H04W 36/14* (2013.01); *H04W 76/38* (2018.02)
(58) Field of Classification Search
CPC . H04W 36/0022; H04W 76/38; H04W 36/14; H04W 36/142
(Continued)

(56) References Cited

U.S. PATENT DOCUMENTS

2009/0119430 A1* 5/2009 Tsujimoto ............. G06F 13/364
710/110
2011/0038280 A1* 2/2011 Jung ....................... H04L 5/001
370/254
(Continued)

FOREIGN PATENT DOCUMENTS

CN 102316454 A 1/2012
CN 105208530 A 12/2015
(Continued)

OTHER PUBLICATIONS

3GPP TS 24.008 V17.3.0 (Jun. 2021), "3rd Generation Partnership Project; Technical Specification Group Core Network and Terminals; Mobile radio interface Layer 3 specification; Core network protocols; Stage 3, (Release 17)", Jun. 25, 2021, pp. 1-799.

*Primary Examiner* — Faruk Hamza
*Assistant Examiner* — Jean F Voltaire
(74) *Attorney, Agent, or Firm* — Conley Rose, P.C.

(57) ABSTRACT

A call drop rate reduction method includes, when a terminal receives a second identity verification request after an initial identity verification and authentication, the terminal compares the first identity verification request received during the initial identity verification with the second identity verification request. After the second identity verification and authentication fails, the terminal monitors a direction of the call service within the timing duration corresponding to the T3320 timer, and when the call service is redirected to success, the terminal automatically stops the T3320 timer to prevent the terminal from automatically executing the call drop process after the T3320 timer expires, thereby effectively avoiding misjudgment in the identity verification and authentication stage, and addressing a call drop caused by misjudgment in the identity verification and authentication (Continued)

stage in existing user scenarios, which reduces the call drop rate and improves user experience.

20 Claims, 9 Drawing Sheets

(58) Field of Classification Search
USPC .......................................................... 370/331
See application file for complete search history.

(56) References Cited

U.S. PATENT DOCUMENTS

| | | | |
|---|---|---|---|
| 2013/0165077 A1 | 6/2013 | Aalla et al. | |
| 2017/0034147 A1 | 2/2017 | Wang et al. | |
| 2017/0142773 A1 | 5/2017 | Nair et al. | |
| 2017/0149772 A1 | 5/2017 | Wang et al. | |
| 2018/0167807 A1 | 6/2018 | Ying et al. | |
| 2019/0014531 A1 | 1/2019 | Fang et al. | |
| 2019/0239071 A1 | 8/2019 | Krishnan et al. | |
| 2020/0304984 A1 | 9/2020 | Dhanapal et al. | |
| 2022/0191968 A1* | 6/2022 | Tsuboi | H04W 56/001 |

FOREIGN PATENT DOCUMENTS

| | | | |
|---|---|---|---|
| CN | 106789851 A | 5/2017 | |
| CN | 108616862 A | 10/2018 | |
| CN | 111182534 A | 5/2020 | |
| CN | 111182534 B | 10/2020 | |
| CN | 111954217 A | 11/2020 | |
| CN | 112637850 A | 4/2021 | |
| CN | 113630776 A | 11/2021 | |
| CN | 114339749 A | 4/2022 | |
| WO | 2015184805 A1 | 12/2015 | |
| WO | 2021185100 A1 | 9/2021 | |

* cited by examiner

Terminal 100

CALL DROP RATE REDUCTION METHOD AND TERMINAL

CROSS-REFERENCE TO RELATED APPLICATIONS

This is a U.S. National Stage of International Application No. PCT/CN2022/112510 filed on Aug. 15, 2022, which claims priority to Chinese Patent Application No. 202111153780.X, filed with the China National Intellectual Property Administration on Sep. 29, 2021, both of which are incorporated herein by reference in its their entireties.

TECHNICAL FIELD

This application relates to the communication field, and in particular, to a call drop rate reduction method and a terminal.

BACKGROUND

Call drop rate is an important indicator in mobile communication, also known as call interruption rate, refers to the probability of accidental interruption of communication in a process of mobile communication. Call drop rate is a very important indicator in the mobile communication network, and a call drop rate level reflects the quality of mobile network communication to a certain extent. Therefore, reducing call drop rates of users has become the focus of network optimization projects.

At present, solutions for reducing call drop rates provided by terminal manufacturers are usually aimed at call drops caused by wireless network call drops, Abis interface call drops, A interface call drops, TC interface call drops, etc. However, in actual user usage scenarios, a stage of identity verification and authentication between a network side and a terminal side also causes a call drop. For example, when calling and called parties use a circuit switched fallback (Circuit Switched Fallback, CSFB) technology or a dual-mode single radio voice call continuity (Single Radio Voice Call Continuity, SRVCC) technology to call a core network (Core Network, CN), the CN initiates an identity verification request to the terminal and starts a T3360 timer. After the T3360 timer expires, if the terminal fails to send an authentication success response message to the CN in time, the CN retransmits the identity verification request. In an actual situation, for the retransmitted identity verification request, a universal subscriber identity module (Universal Subscriber Identity Module, USIM) for identity verification and authentication in the terminal returns an authentication failure because the two identity verification requests are completely consistent, and a cause value is synch failure (Synch failure). In this case, the terminal starts a T3320 timer after receiving an identity verification response indicating a verification failure from the USIM. If no identity verification request retransmitted by the core network for failed verification is received again within a timing period corresponding to the T3320 timer, a call drop and other processes are triggered after the T3320 timer expires.

A call drop is inevitable in this user usage scenario; therefore, it is urgent to provide a technical solution that can reduce call drops in the identity verification and authentication stage.

SUMMARY

To solve the above technical problems, this application provides a call drop rate reduction method and a terminal, which can effectively avoid misjudgment in the identity verification and authentication stage, thereby solving the problem of a call drop caused by misjudgment in the identity verification and authentication stage in the user scenario, to reduce the call drop rate and improve user experience.

According to a first aspect, this application provides a call drop rate reduction method. The method is applied to a terminal, and includes: receiving a first identity verification request sent by a base station, where the first identity verification request is initiated by a core network, and where a T3360 timer is started by the core network after the core network sends the first identity verification request to the base station; sending, through the base station in response to the first identity verification request, a first identity verification response that is for the first identity verification request and that indicates verification success to the core network; receiving a second identity verification request sent by the base station, where the second identity verification request is initiated by the core network after a timing duration corresponding to the T3360 timer expires; determining whether the first identity verification request is the same as the second identity verification request; when the first identity verification request is the same as the second identity verification request, sending, through the base station in response to the second identity verification request, a second identity verification response that is for the second identity verification request and that indicates verification failure to the core network, and starting a T3320 timer; obtaining direction information of a currently executed call service within a timing duration corresponding to the T3320 timer, where the call service is associated with the first identity verification request and the second identity verification request; determining, according to the direction information, whether the call service is redirected to success; and stopping the T3320 timer when the call service is redirected to success. In this way, there is no need to make any changes to the core network, the base station, and the USIM for user identity verification and authentication operations in the terminal. The core network performs identity verification with the terminal according to the normal process, and when the terminal receives the second identity verification request after the initial identity verification and authentication, the terminal compares the first identity verification request received during the initial identity verification with the second identity verification request, after determining that the second identity verification and authentication fails, the terminal monitors a direction of the call service within the timing duration corresponding to the T3320 timer, and when it is determined that the call service is redirected to success, the terminal automatically stops the T3320 timer to prevent the terminal from automatically executing the call drop process after the T3320 timer expires, thereby effectively avoiding misjudgment in the identity verification and authentication stage, and solving the problem of a call drop caused by misjudgment in the identity verification and authentication stage in existing user scenarios, which reduces the call drop rate and improves user experience.

According to the first aspect, after the sending, through the base station in response to the first identity verification request, a first identity verification response that is for the first identity verification request and that indicates verification success to the core network, the method further includes: determining a system time when the first identity verification request is received, to obtain a first moment; obtaining a session identification number of a call service corresponding to the first identity verification request; generating an authentication tuple according to the first identity verification request, the first identity verification response, the session identification number, and the first moment; and establishing and saving a correspondence between the first identity verification request and the authentication tuple. In this way, after obtaining the first identity verification response that is for the first identity verification request and that indicates verification success, data related to the first identity verification request, such as the first identity verification response, the first moment when the first identity verification request is received, and the session identification number of the call service corresponding to the first identity verification request, is obtained, and then an authentication tuple is generated and stored based on the data. In this way, when the second identity verification request that is the same as the first identity verification request and retransmitted by the core network through the base station is subsequently received, the first identity verification response recorded in the authentication tuple can be directly reused. This avoids that the USIM mistakenly believes that synchronization of the core network is abnormal, that is, the SQN is out of range, and thus returns the second identity verification response that indicates authentication failure, causing the terminal to trigger the call drop process.

According to the first aspect or any implementation of the first aspect, the first identity verification request recorded in the authentication tuple includes a random number and an authentication value; where the authentication value is calculated based on the random number. The USIM in the terminal needs to use the authentication value in the first identity verification request when performing identity verification and authentication on the first identity verification request, and the authentication value is calculated based on the random number, so that different identity verification requests can be distinguished. Therefore, in the call drop rate reduction method provided by this application, the first identity verification request required for generating the authentication tuple at least includes a random number and an authentication value.

According to the first aspect or any implementation of the first aspect, the first identity verification response recorded in the authentication tuple includes an A&C reference number, an actual response value, and an expected response value. In an actual application scenario, authentication tuples corresponding to a plurality of different identity verification requests may be stored in the terminal. Therefore, to facilitate finding the first identity verification response that can be reused for the second identity verification request, in the call drop rate reduction method provided in this application, the first identity verification response required for generating the authentication tuple includes the reference number that can identify the response, the actual response value calculated according to the message in the first identity verification request, and the expected response value expected by the core network, so as to facilitate determining whether the current authentication is successful.

According to the first aspect, the first identity verification request sent by the base station is received, and before the sending, through the base station in response to the second identity verification request, a second identity verification response that is for the second identity verification request and that indicates verification failure to the core network, and starting a T3320 timer, the method further includes: determining whether there is the authentication tuple corresponding to the first identity verification request; when there is the authentication tuple corresponding to the first identity verification request, extracting the first identity verification response from the authentication tuple as the second identity verification response that is for the second identity verification request and that indicates verification success, and sending the second identity verification response to the core network through the base station; and when there is no authentication tuple corresponding to the first identity verification request, performing the step of sending, through the base station in response to the second identity verification request, a second identity verification response that is for the second identity verification request and that indicates verification failure to the core network, and starting a T3320 timer. In this way, when receiving the second identity verification request that is the same as the first identity verification request, the terminal first checks whether the stored authentication tuple can be reused for the second identity verification request, and then determines, based on the result, whether the existing authentication tuple is directly reused or the USIM performs the identity authentication and authentication operation in response to the second authentication request again, thereby preventing the USIM from returning authentication failure, thereby preventing the execution of the call drop process from the source and effectively reducing the call drop rate.

According to the first aspect, the receiving a first identity verification request sent by a base station, and sending, through the base station in response to the first identity verification request, a first identity verification response that is for the first identity verification request and that indicates verification success to the core network includes: receiving, through an antenna, the first identity verification request sent by the base station; determining a first USIM for processing the first identity verification request; sending the first identity verification request to the first USIM through a modem associated with the first USIM; in response to the first identity verification request, sending, by the first USIM, the first identity verification response that is for the first identity verification request and that indicates verification success to the modem; and sending, by the modem, the first identity verification response that indicates verification success to the base station through the antenna, so that the base station sends the first identity verification response that indicates verification success to the core network. In this way, the identity verification and authentication initiated by the core network is directly implemented on the Model layer of the terminal without interaction with the upper layer and without user intervention, so that the problem of a call drop in the identity verification and authentication stage can be solved without the perception by the user.

According to the first aspect or any implementation of the first aspect, two USIMs are set in the terminal; and the receiving a second identity verification request sent by the base station, and determining whether the first identity verification request is the same as the second identity verification request includes: receiving, through an antenna, the second identity verification request sent by the base station; determining a second USIM for processing the second identity verification request; sending the second identity verification request to the second USIM through a modem associated with the second USIM; when the first USIM and the second USIM are a same USIM, determining, by the first USIM, whether the first identity verification request is the same as the second identity verification request; when the first USIM and the second USIM are different USIMs, in response to the second identity verification request, sending, by the second USIM, the second identity verification response that is for the second identity verification request and that indicates verification success to the modem associated with the second USIM; and sending, by the modem associated with the second USIM, the second identity verification response that indicates verification success to the base station through the antenna, so that the base station sends the second identity verification response that indicates verification success to the core network. In this way, for a multi-card multi-standby terminal, it is first determined whether the two received identity verification requests correspond to the same USIM, only when the two received identity verification requests are for the same USIM, it is determined whether the two identity verification requests are the same, and determined whether to execute the call drop rate reduction method provided by this application, and when the two received identity verification requests are for different USIMs, there is no need to determine whether the two identity verification requests are the same, and for each identity verification request that arrives at the USIM for the first time, the USIM can directly perform identity verification and authentication.

According to the first aspect or any implementation of the first aspect, the determining whether the first identity verification request is the same as the second identity verification request includes: respectively determining a system time when the first identity verification request is received and a system time when the second identity verification request is received, to obtain a first moment and a second moment; determining whether a time interval between the first moment and the second moment is less than a time threshold; when the time interval is less than the time threshold, determining whether content of the first identity verification request is consistent with content of the second identity verification request; when the content of the first identity verification request is consistent with the content of the second identity verification request, respectively obtaining a session identification number of a call service corresponding to the first identity verification request and a session identification number of a call service corresponding to the second identity verification request; determining whether the session identification number of the call service corresponding to the first identity verification request is the same as the session identification number of the call service corresponding to the second identity verification request; and when the session identification number of the call service corresponding to the first identity verification request is the same as the session identification number of the call service corresponding to the second identity verification request, determining that the first identity verification request is the same as the second identity verification request. In this way, by determining on the time interval, the specific content of the identity verification request, and the session identification number of the call service, it is determined from a plurality of dimensions whether the first identity verification request is the same as the second identity verification request, that is, whether the second identity verification request is the first identity verification request that is retransmitted. This can avoid the problem of a call drop caused by authentication failure caused by the misjudgment of the retransmitted identity verification request in the existing authentication and authentication stage, and avoid that different identity verification requests are mistaken as retransmitted requests and consequently a new call service cannot be executed smoothly.

According to the first aspect or any implementation of the first aspect, the determining whether content of the first identity verification request is consistent with content of the second identity verification request includes: obtaining a first serial number corresponding to the first identity verification request and a second serial number corresponding to the second identity verification request; where serial numbers for different identity verification requests are different; determining whether the first serial number is the same as the second serial number; and when the first serial number is the same as the second serial number, determining that the content of the first identity verification request is consistent with the content of the second identity verification request. In this way, it is fast and convenient to determine whether the two identity verification requests are the same by comparing the serial numbers that can identify their uniqueness in the two identity verification requests, without comparing the specific content in the two identity verification requests.

According to the first aspect or any implementation of the first aspect, the sending, through the base station in response to the second identity verification request, a second identity verification response that is for the second identity verification request and that indicates verification failure to the core network, and starting a T3320 timer includes: in response to the second identity verification request, generating, by the first USIM, the second identity verification response whose cause value of verification failure is synch failure; sending, by the first USIM, the second identity verification response to the modem; and sending, by the modem, the second identity verification response that indicates verification failure to the base station through the antenna, so that the base station sends the second identity verification response that indicates verification failure to the core network. Since the terminal starts the T3320 timer only when the synch failure is carried in the identity verification response returned by the USIM, the USIM that processes the second identity verification request in this application returns the second identity verification response whose cause value of verification failure is synch failure, so that the terminal can start the T3320 timer after sending the second identity verification response to the base station.

According to the first aspect or any implementation of the first aspect, the determining, according to the direction information, whether the call service is redirected to success includes: determining whether the direction information is Routing Area Update Accept, or Service Accept, or connect, or connect act; and when the direction information is Routing Area Update Accept, or Service Accept, or connect, or connect act, determining that the call service is redirected to success. Exemplarily, in an actual application scenario, when the terminal receives Routing Area Update Accept, or Service Accept, or connect, or connect act, it often indicates that the current call service is being redirected to success. Therefore, in the call drop rate reduction method provided in this application, by determining whether the direction information is any one of the above, it can be quickly determined whether the call service is redirected to success, and then the T3320 timer is stopped in advance before the T3320 timer expires, thereby preventing the execution of the call drop procedure and enabling the current call service to proceed normally and improving user experience.

According to the first aspect or any implementation of the first aspect, after the determining whether the first identity verification request is the same as the second identity verification request, the method further includes: when the first identity verification request is not the same as the second identity verification request, sending, through the base station in response to the second identity verification request, the second identity verification response that is for the second identity verification request and that indicates verification success to the core network. In this way, when it is determined that the first identity verification request is not the same as the second identity verification request, that is, the second identity verification request is not the first identity verification request that is retransmitted, the terminal performs processing according to the normal authentication process, thus taking into account the execution of the normal authentication process and avoiding misjudgment of the retransmission of the identity verification request.

According to a second aspect, this application provides a terminal. The terminal includes: at least one USIM, a modem associated with the at least one USIM, one or more processors, a memory, and one or more computer programs; where the one or more computer programs are stored on the memory, and when the computer program is executed by the one or more processors, the terminal is caused to execute the method in the first aspect or any possible implementation of the first aspect.

According to a third aspect, this application provides a computer-readable medium for storing a computer program, where the computer program includes instructions for executing the method in the first aspect or any possible implementation of the first aspect.

According to a fourth aspect, this application provides a computer program, where the computer program includes instructions for executing the method in the first aspect or any possible implementation of the first aspect.

According to a fifth aspect, this application provides a chip. The chip includes: one or more processing circuits and one or more transceiver pins; where the transceiver pins and the processing circuits communicate with each other through an internal connection path, and the processing circuit executes the method in the first aspect or any possible implementation of the first aspect, to control a receiving pin to receive a signal and to control a sending pin to send a signal.

According to a sixth aspect, this application provides a call drop rate reduction system. The system includes a base station, a core network, and the terminal in the second aspect.

BRIEF DESCRIPTION OF THE ACCOMPANYING DRAWINGS

DETAILED DESCRIPTION

Figure 1:
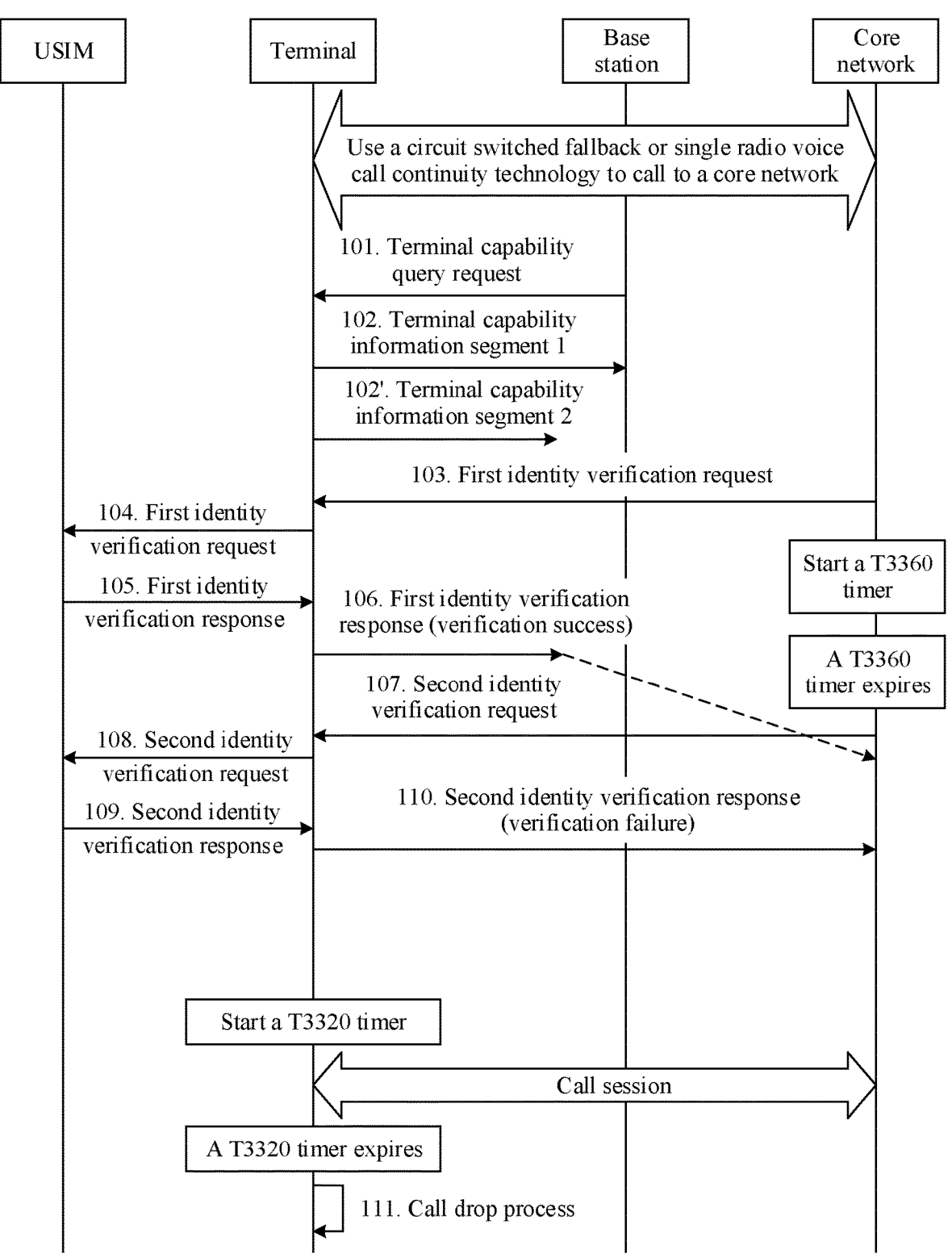
FIG. 1 is a sequence diagram of an exemplary identity verification and authentication stage.

The following clearly and completely describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

In this specification, the term "and/or" is merely an association relationship that describes associated objects, and represents that there may be three relationships. For example, A and/or B may represent three cases: only A exists, both A and B exist, and only B exists.

In the specification and claims of the embodiments of this application, the terms such as "first" and "second" are used to distinguish between different objects, but are not used to describe a particular sequence of the objects. For example, the first target object, the second target object, etc. are used to distinguish different target objects, rather than describing a specific order of the target objects.

In the embodiments of this application, the word "exemplary" or "for example" is used to represent giving an example, an illustration, or a description. Any embodiment or design scheme described by using "exemplarily" or "for example" in the embodiments of this application should not be explained as being more preferred or having more advantages than another embodiment or design scheme. In particular, the terms such as "exemplary" and "example" as used herein are intended to present the related concept in a specific implementation.

In the description of the embodiments of this application, unless otherwise specified, the meaning of "a plurality of" means two or more. For example, a plurality of processing units mean two or more processing units, and a plurality of systems mean two or more systems.

Before describing the technical solutions of the embodiments of this application, first, the scenarios of the call drop rate reduction method provided by the embodiments of this application will be described with reference to the accompanying drawings.

Specifically, the call drop rate reduction method provided by the embodiments of this application is specifically aimed at an identity verification and authentication stage.

Understandably, data exchanged between a terminal and a core network is usually forwarded by a base station. Therefore, in an actual application scenario, a network grant size for the terminal to access through the base station directly affects the time taken to report terminal capability information to the base station. A request for querying the terminal capability by the base station arrives at the terminal before the identity verification request initiated by the core network, and therefore response information of the terminal in response to the request for querying the terminal capability by the base station is ranked before a response message in response to the identity verification request. Therefore, the verification success identity verification response sent by the terminal for the identity verification request may not arrive at the base station within the time duration corresponding to the T3360 timer. In this case, the base station retransmits the previous identity verification request, and as a result, the USIM in the terminal misjudges and triggers the call drop process.

Based on the above implementation logic, a specific description will be made in conjunction with FIG. 1.

Referring to FIG. 1, when a terminal, such as a calling terminal or a called terminal, calls the core network CN using a CSFB technology or an SRVCC technology, the base station sends a terminal capability query request to the terminal, that is, step 101 is executed.

Correspondingly, when the terminal receives the terminal capability query request sent by the base station, the terminal responds to the request and continuously reports obtained terminal capability information segments (subsequently denoted by SEG), such as SEG-1 to SEG-N, to the base station, that is, operations of step 102 and step 102' are performed.

Still referring to FIG. 1, in an actual application scenario, terminal capability information segments queued to be reported to the base station in the queue may not all be uploaded. For example, in step 102', the terminal capability information SEG-N is still queued for upload, and the first identity verification request sent by the core network to the terminal through the base station arrives at the terminal, that is, the operation of step 103. After the terminal receives the first identity verification request from the core network sent by the base station, the terminal sends the first identity verification request to a built-in USIM or SIM card, that is, step 104 is executed.

Correspondingly, the USIM or SIM card performs identity verification and authentication processing in response to the first identity verification request, and then obtains a first identity verification response for the first identity verification request, and feeds back the first identity verification response to the terminal, that is, step 105 is executed.

Exemplarily, it is assumed that the first identity verification response for the first identity verification request indicates verification success. However, since there are still unreported terminal capability information segments in the queue currently for sending messages to the base station, such as SEG-N, the obtained first identity verification response needs to be ranked after the terminal capability information SEG-N, that is, after the terminal capability information SEG-N is reported to the base station, the first identity verification response is sent to the base station. Then, the base station forwards the first identity verification response to the core network, that is, step 106. However, in an actual application scenario, after the core network initiates the first identity verification request, the core network starts the T3360 timer, the core network retransmits the previous identity verification request after the T3360 timer expires (the timing duration is generally set to 6 s), that is, step 107 is executed, and the base station sends a second identity verification request to the terminal.

Understandably, in an actual application scenario, for retransmission of an identity verification request, the second identity verification request in step 107 is essentially the first identity verification request, that is, information such as the content and the session identification number of the corresponding call service are all the same.

Correspondingly, after receiving the second identity verification request, the terminal also sends the second identity verification request to the USIM or SIM for identity verification and authentication processing, that is, step 108 is executed.

Correspondingly, the USIM or SIM performs identity verification and authentication processing in response to the second identity verification request, and then obtains a first identity verification response for the second identity verification request, and feeds back the second identity verification response to the terminal, that is, step 109 is executed.

It should be noted that since the second identity verification request is the retransmitted first identity verification request, and the USIM or SIM has already sent the first identity verification response that indicates verification success for the first identity verification request, if the second identity verification request is received again, it is misjudged that the identity verification and authentication with the core network fails, and therefore a verification failure is returned, and the specific carried cause value of the verification failure can be synch failure.

Correspondingly, after receiving the second identity verification response that indicates verification failure, the terminal sends the second identity verification response that indicates verification failure to the base station, and then the base station forwards the second identity verification response to the core network, that is, step 110 is executed.

In addition, it should be noted that in an actual application scenario, after the terminal sends the second identity verification response that indicates verification failure and that has synch failure as the cause value, the terminal starts the T3320 timer and waits for the core network to re-initiate the identity verification request. If the core network does not re-initiate the identity verification request within the time duration corresponding to the T3320 timer, the call drop process is automatically triggered after the T3320 timer expires, that is, step 111.

However, referring to FIG. 1, it can be seen that the first identity verification response that indicates verification success is not discarded, and the core network only delays reception, that is, after the core network retransmits the previous identity verification request, although the T3360 timer has expired, the first identity verification response that indicates verification success for the first identity verification request arrives at the core network before the second identity verification response that indicates verification failure. Therefore, the core network mistakenly thinks that the received first identity verification response is for the second identity verification request. Because the response received indicates verification success, the call service continues, that is, the core network does not re-initiate the identity verification request within the time duration corresponding to the T3320 timer. In this way, the terminal inevitably executes the call drop process after the T3320 timer expires. Specifically, the local release is performed first, then the current call is barred, and the link is actively disconnected, resulting in a call drop.

Figure 2:
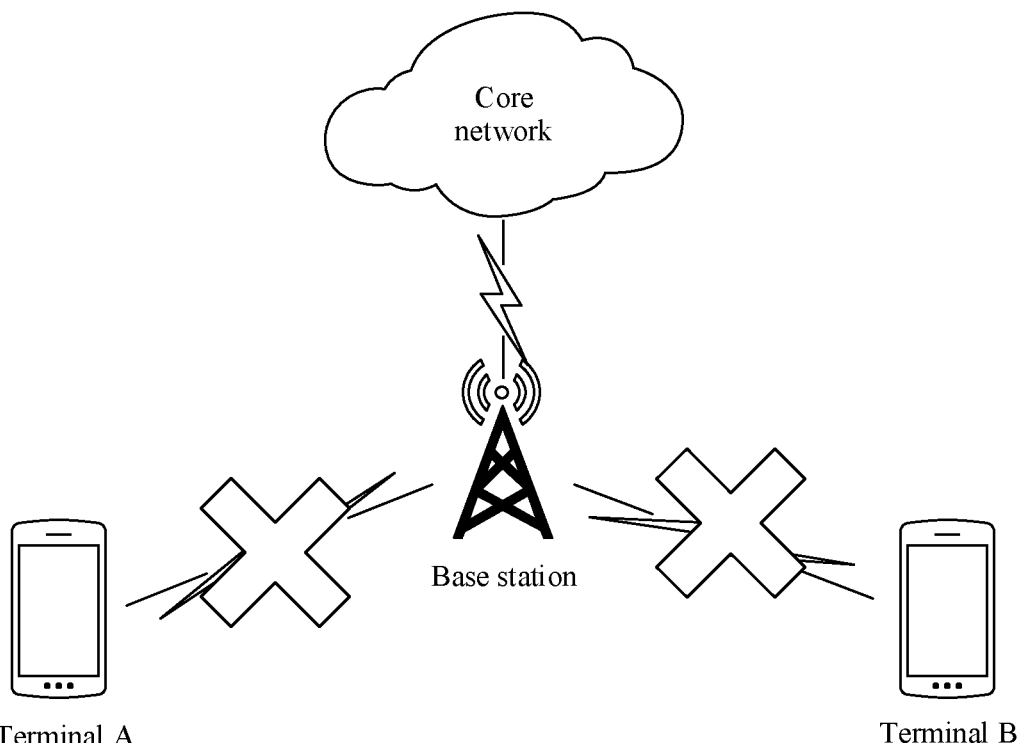
FIG. 2 is a schematic diagram of a call drop scenario in an exemplary identity verification and authentication stage.

For example, FIG. 2 is a schematic diagram of a call drop scenario in an identity verification and authentication stage in FIG. 1.

Specifically, according to the above description, when a user uses USIM_1 in terminal A to call USIM_2 in terminal B, the core network sends a first identity verification request to terminal A through the base station, and USIM_1 in terminal A performs identity verification. If terminal A, the base station, and the core network perform operations in accordance with the above steps 101 to 110, before the second identity verification response that indicates verification failure arrives at the core network, the core network has received the first identity verification response that indicates verification success. In this case, the core network sends the call request for calling USIM_2 in terminal B by USIM_1 in terminal A to terminal B through the base station. If the called user answers the current call, terminal A cannot receive, within the timing duration corresponding to the T3320 timer, the identity verification request retransmitted by the core network through the base station. After the T3320 timer expires, the call drop process is executed, so that the established call is interrupted, and as shown in FIG. 2, a communication link between terminal A and the base station and a communication link between the base station and terminal B are disconnected.

In order to solve the problem of a call drop existing in the identity verification and authentication stage, the call drop rate reduction method provided by the embodiments of this application is proposed. In this method, there is no need to make any changes to the core network, the base station, and the USIM. The core network performs identity verification with the terminal according to the normal process, and when the terminal receives the second identity verification request after the initial identity verification and authentication, the terminal compares the first identity verification request received during the initial identity verification with the second identity verification request, after determining that the second identity verification and authentication fails, the terminal monitors a direction of the call service within the timing duration corresponding to the T3320 timer, and when it is determined that the call service is redirected to success, the terminal automatically stops the T3320 timer to prevent the terminal from automatically executing the call drop process after the T3320 timer expires, thereby effectively avoiding misjudgment in the identity verification and authentication stage, and solving the problem of a call drop caused by misjudgment in the identity verification and authentication stage in existing user scenarios, which reduces the call drop rate and improves user experience.

In order to better understand the call drop rate reduction method provided by the embodiments of this application, the hardware structure of the terminal to which the method is applicable will be described below in conjunction with FIG. 3. The process of the terminal based on the hardware structure implementing the call drop rate reduction method provided in the embodiments of this application will be described in conjunction with FIG. 4 to FIG. 7.

Figure 3:
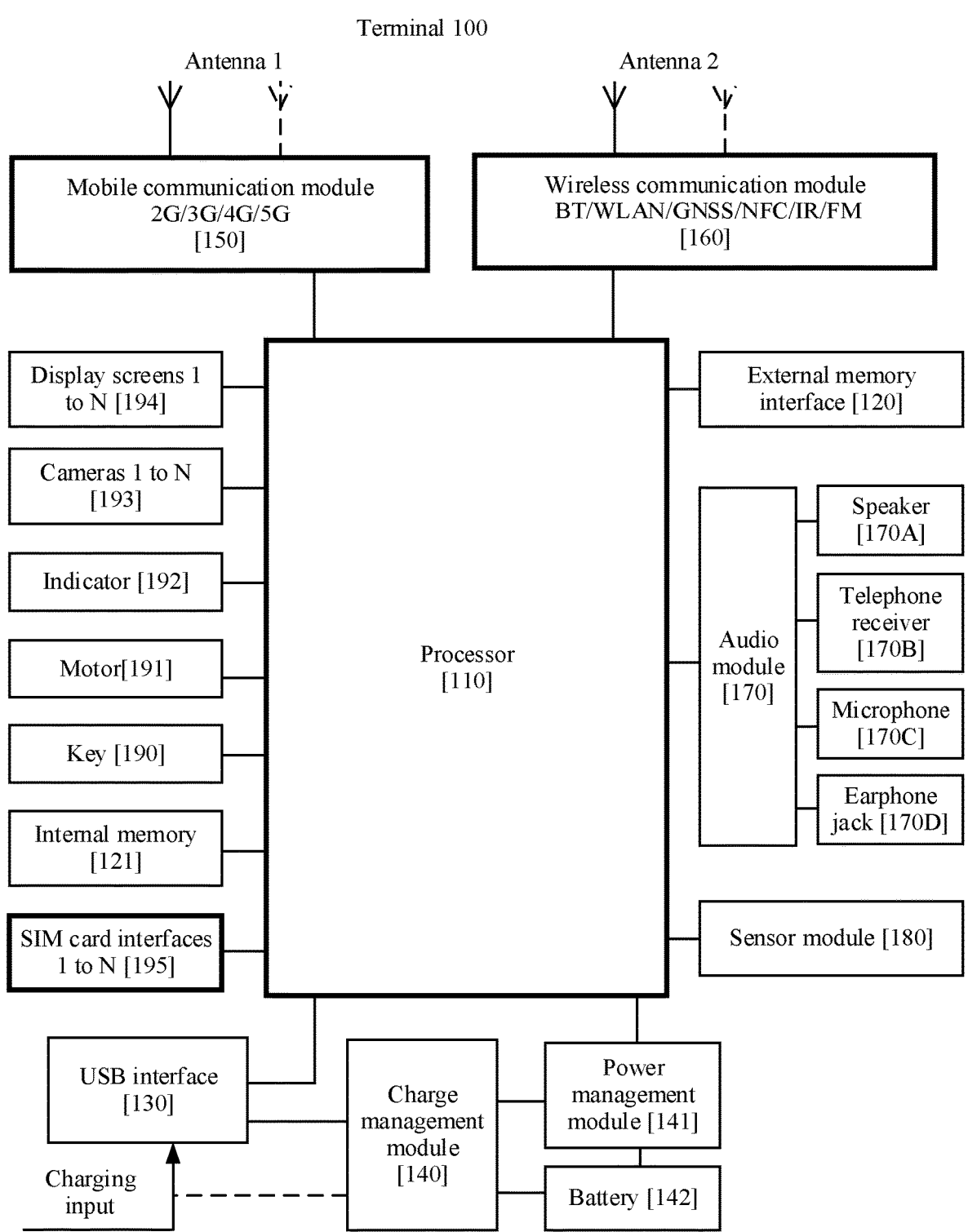
FIG. 3 is a schematic diagram of an exemplary hardware structure of a terminal.

FIG. 3 is a schematic diagram of a hardware structure of a terminal 100 exemplarily shown to implement the call drop rate reduction method provided by the embodiments of this application.

As shown in FIG. 3, the terminal 100 may include a processor 110, an external memory interface 120, an internal memory 121, a universal serial bus (universal serial bus, USB) interface 130, a charge management module 140, a power management module 141, a battery 142, an antenna 1, an antenna 2, a mobile communication module 150, a wireless communication module 160, an audio module 170, a sensor module 180, a key 190, a motor 191, an indicator 192, a camera 193, a display screen 194, and a subscriber identification module (subscriber identification module, SIM) card interface 195, and the like.

The antenna 1 and the antenna 2 are configured to transmit and receive an electromagnetic wave signal. Each antenna in the terminal 100 may be configured to cover a single communications frequency band or a plurality of communications frequency bands. Different antennas may further be multiplexed to improve utilization of the antennas. For example: the antenna 1 may be multiplexed into a diversity antenna of a wireless local area network. In some other embodiments, the antennas may be used with a tuning switch.

It should be noted that in the embodiments of this application, the terminal receives the identity verification request sent by the base station and sends the identity verification response to the base station through the antenna 1 or the antenna 2.

The mobile communications module 150 can provide a solution for wireless communication including 2G/3G/4G/5G and the like to be applied to the terminal 100. The mobile communications module 150 may include at least one filter, a switch, a power amplifier, a low noise amplifier (low noise amplifier, LNA), and the like. The wireless communications module 160 may provide a solution to wireless communication applied to the terminal 100, for example, a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), and an infrared (infrared, IR) technology.

In some embodiments, in the terminal 100, the antenna 1 is coupled to the mobile communication module 150, and the antenna 2 is coupled to the wireless communication module 160, so that the terminal 100 can communicate with a network and another device by using a wireless communication technology.

Referring to FIG. 3, for example, the audio module 170 of the terminal 100 includes a speaker 170A, a telephone receiver 170B, a microphone 170C, an earphone jack 170D, and the like.

For example: the terminal 100 may implement an audio function such as music playing or recording or a voice call by using the speaker 170A, the telephone receiver 170B, the microphone 170C, the earphone jack 170D, the application processor, and the like in the audio module 170.

In addition, the sensor module 180 in the terminal 100 in some embodiments may include a pressure sensor, a gyroscope sensor, an air pressure sensor, a magnetic sensor, an acceleration sensor, a distance sensor, a proximity light sensor, a fingerprint sensor, a temperature sensor, a touch sensor, an ambient light sensor, a bone conduction sensor, and the like, which are not listed herein and are not limited in this application.

In addition, it should be noted that, in some embodiments, the processor 110 may include one or more processing units. For example: the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU).

Understandably, in a specific implementation, different processing units may be independent devices, or may be integrated in one or more processors.

In addition, in some embodiments, the controller may be the nerve center and the command center of the terminal 100. The controller may generate an operation control signal according to instruction operation code and a time-sequence signal, and control obtaining and executing of instructions.

In addition, the memory in the processor 110 is mainly configured to store instructions and data. In some embodiments, the memory in the processor 110 is a cache memory.

In addition, the USB interface 130 shown in FIG. 3 is an interface that complies with the USB standard specification, and may be specifically a Mini USB interface, a Micro USB interface, a USB Type C interface, and the like.

The charge management module 140 is configured to receive charging input from the charger. In addition, the power management module 141 shown in FIG. 3 is configured to be connected to the battery 142, the charging management module 140, and the processor 110. The power management module 141 receives input from the battery 142 and/or the charge management module 140, and supplies power to the processor 110, the internal memory 121, the external memory, the display screen 194, the camera 193, the wireless communications module 160, and the like. A wireless communications function of the terminal 100 may be implemented by using the antenna 1, the antenna 2, the mobile communications module 150, the wireless communications module 160, the modem processor, the baseband processor, and the like.

In addition, the terminal 100 shown in FIG. 3 implements a display function through a GPU, a display screen 194, an application processor, and the like. The GPU is a microprocessor for image processing and connects the display screen 194 and the application processor. The GPU is configured to perform mathematical and geometric calculations, and is configured to render graphics. The processor 110 may include one or more GPUs that execute a program instruction to generate or change display information.

The display screen 194 is specifically configured to display an image, a video, and the like. The display screen 194 includes a display panel. In some embodiments, the terminal 100 may include 1 or N displays 194, where N is a positive integer greater than 1.

Exemplarily, in this embodiment of the application, in addition to displaying images, videos, and other content, the display screen is also configured to cooperate with sensors, such as a pressure sensor, so that the terminal can determine a specific location of an application triggered by the user, and then determine a specific application triggered by the user.

In addition, the terminal 100 may implement a photographing function by using the ISP, the camera 193, the video codec, the GPU, the display screen 194, the application processor, and the like.

The camera 193 is configured to capture still images or videos. In some embodiments, the terminal 100 may include 1 or N cameras 193, where N is a positive integer greater than 1.

In addition, the external memory interface 120 shown in FIG. 3 may be configured to connect to an external storage card such as a micro SD card, to extend a storage capability of the terminal 100. The external storage card communicates with the processor 110 by using the external memory interface 120, to implement a data storage function, for example, store files such as music and a video into the external storage card.

In addition, the internal memory 121 shown in FIG. 3 may be configured to store computer-executable program code. The executable program code includes an instruction. The processor 110 runs the instructions stored in the internal memory 121, to implement various functional applications and data processing of the terminal 100.

Specifically, relevant instructions for implementing the call drop rate reduction method provided by the embodiments of this application are pre-stored in the internal memory 121, and the processor 110 can execute the instructions stored in the internal memory 121, thereby enabling the terminal 100 to execute the call drop rate reduction method provided by the embodiments of this application.

In addition, the motor 191 shown in FIG. 3 may be, for example, a vibration motor; and the indicator 192 may be an indicator light.

The SIM card interface 195 is configured to connect to a SIM card or a USIM card. The SIM card may be inserted into the SIM card interface 195 or plugged from the SIM card interface 195, to come into contact with or be separated from the terminal 100. The terminal 100 may support 1 or N (N is an integer greater than 1) SIM card interfaces 195. That is, the plurality of SIM cards or USIM cards can be inserted into the terminal.

In addition, it should be noted that, in an actual application scenario, in addition to setting a SIM card or USIM card (subsequently referred to as USIM) in each terminal, a modem (Modem) corresponding to or associated with the USIM is also set, the number of modems can be the same as the number of USIMs, and modems correspond one-to-one to USIMs. That is, each USIM in the terminal corresponds to a modem, so that a call service of each USIM can be directly processed by the Modem associated with the USIM, for example, when the antenna receives an identity verification request for USIM1 initiated by the core network and sent by the base station, the antenna sends the identity verification request to modem1 associated with USIM1, and then modem1 sends the identity verification request to USIM1 for processing.

In addition, in another example, the number of modems may be different from the number of USIMs. For example, for a terminal using a Qualcomm chip, there may be only one modem inside, but two or more USIMs may be set. In this case, the relationship between the modem and each USIM can be maintained by the modem itself, which is not limited in this application.

The hardware structure of the terminal 100 has been described. It should be understood that the terminal 100 shown in FIG. 3 is only an example. In a specific implementation, the terminal 100 can have more or fewer components than shown in the figure, can combine two or more components, or can have different component configurations. The various components shown in FIG. 3 may be implemented in hardware, software, or a combination of hardware and software including one or more signal processing and/or application specific integrated circuits.

Taking the terminal with the hardware structure shown in FIG. 3 as an example, the flow of the terminal implementing the call drop rate reduction method provided by the embodiments of this application will be described in detail.

Figure 4:
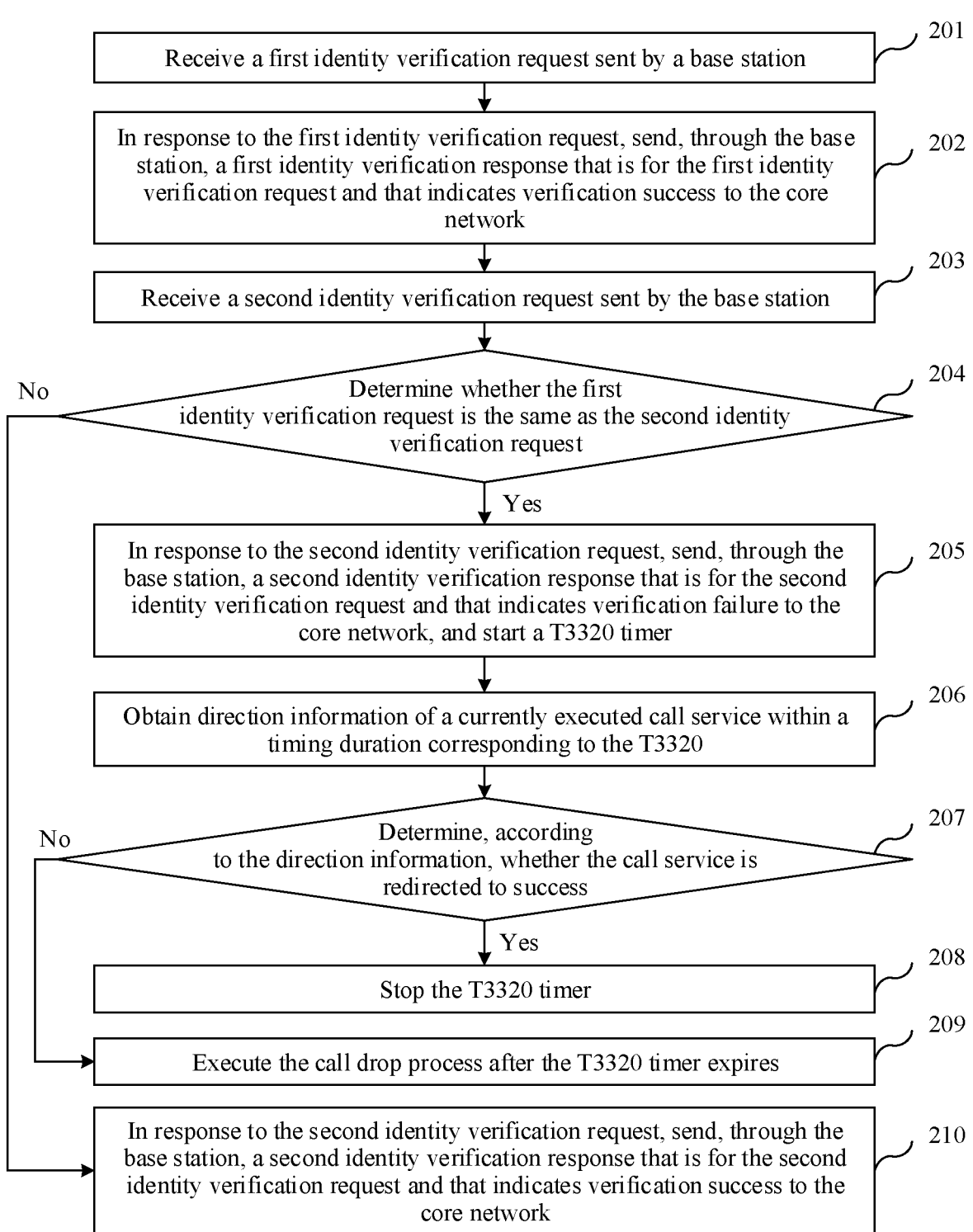
FIG. 4 is a schematic flowchart 1 of an exemplary call drop rate reduction method according to an embodiment of this application.

Referring to FIG. 4, a specific implementation of a call drop rate reduction method provided by the embodiments of this application, specifically includes:

Step 201: Receive a first identity verification request sent by a base station.

Exemplarily, in some embodiments, the terminal configured to receive the first identity verification request sent by the base station may be, for example, UE (User Equipment) often referred to in the field of mobile communications.

Understandably, in 3G and 4G networks, a user terminal is called UE, which is equivalent to an MS (Mobile Station) in the 2G network, that is, a mobile station/mobile platform with characteristics of both a workstation and a notebook computer. Therefore, in some other embodiments, the terminal configured to receive the first identity verification request sent by the base station may also be the MS.

In addition, it can be understood that in an actual application scenario, UEs include but are not limited to mobile phones, smart terminals, multimedia devices, streaming media devices, and the like, which are not listed herein and are not limited in this application. For ease of description, this embodiment takes a mobile phone as an example.

In addition, it should be noted that since the call service is for the USIM set in the terminal, the identity verification and authentication operation between the core network and the terminal is essentially completed by the USIM set in the terminal. That is, after receiving the first identity verification request sent by the base station, the terminal sends the first identity verification request to the corresponding USIM for identity verification and authentication.

Specifically, it can be seen from the above description of the hardware structure of the terminal that the antenna in the terminal is configured to receive and transmit electromagnetic wave signals. Therefore, the terminal receives, through the internal antenna, the first identity verification request sent by the base station, and then sends, through the modem associated with the USIM, the first identity verification request to the USIM for identity verification and authentication processing.

Understandably, in an actual application scenario, a plurality of USIMs may be set in the terminal, that is, the terminal is a multi-card multi-standby terminal. To ensure that the identity verification request is processed by the correct USIM, after the terminal receives, through the antenna, the first identity verification request sent by the base station, the terminal needs to first determine a USIM that processes the first identity verification request. For example, the USIM that processes the first identity verification request can be called a first USIM, and then the modem associated with the first USIM sends the first identity verification request to the first USIM.

Exemplarily, in an example, the first USIM determined to process the first identity verification request is the originator of the call service corresponding to the first identity verification request.

In addition, it should be noted that in an actual application scenario, after the core network sends the first identity verification request to the base station, the core network starts a T3360 timer according to the stipulations of the 3GPP protocol, and sets a corresponding timing duration, such as 6 s.

It should be understood that the above description is only an example for better understanding of the technical solution of this embodiment, and is not the only limitation to this embodiment. In an actual application scenario, the timing duration set for the T3360 timer can be determined according to the current network situation, the grant size occupied by the terminal, and the real-time requirements of the service scenario. The specific setting method is not limited or explained in this application.

Step 202: In response to the first identity verification request, send, through the base station, a first identity verification response that is for the first identity verification request and that indicates verification success to the core network.

Specifically, the operation in response to the first identity verification request in step 202 is performed by the USIM set in the terminal, that is, the USIM performs identity verification and authentication processing according to the received first identity verification request. The authentication process is not modified in this embodiment and will not be described herein.

Correspondingly, after the USIM completes the identity verification and authentication process for the first identity verification request, the USIM sends the first identity verification response for the first identity verification request to the associated modem, and then the modem sends the first identity verification response to the antenna, and the first identity verification response is sent to the base station through the antenna, so that the base station can forward the first identity verification response to the core network.

Understandably, in an actual application scenario, an authentication result of the USIM for the first identity verification request is either authentication success (authentication success) or authentication failure (authentication failure). After the authentication fails, regardless of whether the started T3360 timer expires, after receiving the first identity verification response that indicates authentication failure, the call service does not continue to redirect, and instead the core network initiates the operation of retransmitting the identity verification request. Therefore, after the authentication fails, the terminal can receive the retransmitted identity verification request within the timing duration corresponding to the started T3320 timer, and therefore the call drop process is not triggered. Therefore, this embodiment mainly addresses the problem that when the authentication result is authentication success, a call drop is caused by retransmission of the identity verification request initiated before the core network delays receiving the first identity verification response that indicates verification success.

That is, in this embodiment, for the initial identity verification request initiated by the core network, the USIM sends a first identity verification response that indicates verification success.

Step 203: Receive a second identity verification request sent by the base station.

Exemplarily, for the base station, all identity verification requests that need to be sent to the terminal come from the core network. Similarly, for the terminal, the operation of receiving the identity verification request from the base station is realized through an internal antenna. For details of the receiving process, refer to the description in step 201, which will not be repeated herein.

Step 204: Determine whether the first identity verification request is the same as the second identity verification request.

Specifically, after receiving the second identity verification request through the antenna, in an example, in order to determine whether the second identity verification request is the retransmitted first identity verification request, the USIM may perform determining processing, and then provide a processing result, or the terminal can also directly perform determining without the USIM.

Exemplarily, this embodiment uses an example of the scenario in which the USIM needs to perform determining, that is, the antenna needs to send the received second identity verification request to the modem, and then the modem sends the second identity verification request to the associated USIM for processing.

Specifically, in this scenario, that is, the USIM performs identity verification and authentication processing on all identity verification requests received by the terminal, when the USIM performs identity verification and authentication processing, the USIM compares the first identity verification request with the second identity verification request, and in an example, the USIM may compare serial numbers that can identify the uniqueness of the authentication requests.

Understandably, for different identity verification requests, that is, the first identity verification request and the second identity verification request are different, the two serial numbers are different. Therefore, the USIM can identify that the first identity verification request and the second identity verification request are different. For the second identity verification request, after the time period corresponding to the T3360 timer expires, when the core network retransmits the identity verification request for the first identity verification request, the second identity verification request is actually the first identity verification request. The contents, corresponding serial numbers, and call services carried by the two identity verification requests are completely the same. Therefore, in this case, the USIM considers that the first identity verification request and the second identity verification request are the same.

Furthermore, in practical applications, the time interval between two identity verification requests and the call service corresponding to each identity verification request also affect the determining result. Even if the serial numbers of the two requests are the same, if the time interval is greater than a threshold or the corresponding call services are different, the two identity verification requests cannot be directly regarded as the same. Therefore, when determining whether the first identity verification request and the second identity verification request are the same, two factors, the time interval and the call service, may also be introduced.

Specifically, after receiving the second identity verification request, the USIM respectively determines a system time when the first identity verification request is received and a system time when the second identity verification request is received, to obtain a first moment and a second moment; and then determines whether a time interval between the first moment and the second moment is less than a time threshold.

Correspondingly, when the time interval is less than the time threshold, the USIM continues to determine whether content of the first identity verification request is consistent with content of the second identity verification request; for example, can perform determining by comparing serial numbers that can identify the identity verification requests.

Correspondingly, when the content of the first identity verification request is consistent with the content of the second identity verification request, the USIM further obtains the session identification number of the call service corresponding to the first identity verification request and the session identification number of the call service corresponding to the second identity verification request, and then continues to determine whether the session identification number of the call service corresponding to the first identity verification request is the same as the session identification number of the call service corresponding to the second identity verification request.

Correspondingly, when the session identification number of the call service corresponding to the first identity verification request is the same as the session identification number of the call service corresponding to the second identity verification request, it is determined that the first identity verification request is the same as the second identity verification request.

It should be understood that the above description is only an example for better understanding of the technical solution of this embodiment, and is not the only limitation to this embodiment. In actual application scenarios, different determining conditions can be set according to actual service requirements, and there is no limitation herein.

Therefore, in step 204, if it is determined that the first identity verification request and the second identity verification request are the same, perform step 205; otherwise, perform step 210.

In addition, it should be noted that in an actual application scenario, if a plurality of USIMs are set in the terminal, for example, two USIMs, when the terminal receives the second identity verification request sent by the base station and determines whether the first identity verification request is the same as the second identity verification request, it may first be determined whether the second identity verification request needs to be processed by the USIM that processes the first identity verification request.

For example, assuming that the USIM that processes the first identity verification request is the first USIM, operations in steps 203 and 204 above are specifically: first receiving, through an antenna, the second identity verification request sent by the base station; then determining a second USIM for processing the second identity verification request; then sending the second identity verification request to the second USIM through a modem associated with the second USIM; then when the first USIM and the second USIM are a same USIM, determining, by the first USIM, whether the first identity verification request is the same as the second identity verification request; when the first USIM and the second USIM are different USIMs, in response to the second identity verification request, sending, by the second USIM, the second identity verification response that is for the second identity verification request and that indicates verification success to the modem; and sending, by the modem, the second identity verification response that indicates verification success to the base station through the antenna, so that the base station sends the second identity verification response that indicates verification success to the core network.

Step 205: Send, through the base station in response to the second identity verification request, a second identity verification response that is for the second identity verification request and that indicates verification failure to the core network, and start a T3320 timer.

Specifically, in step 205, the operation in response to the second identity verification request is still performed by the USIM, but when the USIM determines that the first identity verification request is the same as the second identity verification request, the USIM mistakenly considers that the identity verification and authentication with the core network fails, and therefore returns verification failure. A specifically carried cause value of the verification failure can be synch failure. That is, the second identity verification response that indicates verification failure is sent for the second identity verification request.

Correspondingly, after the second identity verification response that indicates verification failure is made, the USIM sends the authentication result to the modem associated with the USIM, and then the modem sends the authentication result to the base station through the antenna, so that the base station sends the second identity verification response whose authentication result is verification failure to the core network.

In addition, as can be known based on the stipulations of the 3GPP protocol, in an actual application scenario, after the terminal sends the second identity verification response that indicates verification failure and that has synch failure as the cause value, the terminal starts the T3320 timer and waits for the core network to re-initiate the identity verification request. If the core network does not re-initiate the identity verification request within the time duration corresponding to the T3320 timer, the call drop process is automatically triggered after the T3320 timer expires, that is, perform step 209.

Therefore, in this embodiment, after the terminal sends the second identity verification response whose cause value of verification failure is synch failure to the base station through the antenna, the terminal starts the T3320 timer and sets a corresponding timing duration.

Understandably, in an actual application scenario, the timing duration set for the T3320 timer can also be determined according to the current network situation, the grant size occupied by the terminal, and the real-time requirements of the service scenario. The specific setting method is not limited or explained in this application.

Step 206: Obtain direction information of a currently executed call service within a timing duration corresponding to the T3320 timer.

Specifically, after the terminal sends the second identity verification response whose cause value of verification failure is synch failure to the base station through the antenna, the terminal monitors, within the timing duration corresponding to the started T3320 timer, whether the identity verification request is retransmitted, and also monitors whether there is a call service being executed, and obtains the direction information of the currently executing call service.

Exemplarily, if no retransmitted identity verification request is received within the timing duration corresponding to the T3320 timer, but it is detected that there is currently a call service being executed, the direction information of the currently executed call service is obtained.

Step 207: Determine, according to the direction information, whether the call service is redirected to success.

Specifically, in step 207, if it is determined that the call service is redirected to success, perform step 208; otherwise, perform step 209.

Exemplarily, it is found based on redirection of the flow during the execution of the call service that when the direction information is Routing Area Update Accept, or Service Accept, or connect, or connect act, the current call service usually redirects to success. Therefore, in this embodiment, when determining, according to the direction information, whether the call service is redirected to success, it is specifically determined whether the direction information is Routing Area Update Accept, or Service Accept, or connect, or connect act.

Correspondingly, when the direction information is Routing Area Update Accept, or Service Accept, or connect, or connect act, it is determined that the call service is redirected to success.

It should be understood that the above description is only an example for better understanding of the technical solution of this embodiment, and is not the only limitation to this embodiment.

Step 208: Stop the T3320 timer.

Specifically, when it is determined according to the direction information that the currently executed call service is redirected to success, it means that the core network no longer retransmits the identity verification request to the terminal. In this case, to avoid that the terminal enters the call drop process after the T3320 timer expires, which may cause a call drop and affect the user experience, the terminal actively stops the T3320 timer, thereby preventing the execution of the call drop process.

Step 209: Execute the call drop process after the T3320 timer expires.

It is understandable, the call drop process executed when the T3320 timer expires is specifically: the local release is performed first, and then the current call is barred, and the link is actively disconnected, resulting in a call drop.

In addition, it should be noted that although in the call drop rate reduction method provided by this embodiment, the call drop process may still be triggered after the T3320 timer expires, it is found through actual tests that after the core network receives the delayed first identity verification message that indicates verification success, the direction information sent to the terminal when the call service is triggered to redirect to success is usually obtained by the terminal within the timing duration corresponding to the T3320 timer. Therefore, the call drop rate reduction method provided by this embodiment can largely avoid a call drop during the identity verification and authentication stage, thereby reducing the call drop rate and improving user experience.

Step 210: Send, through the base station in response to the second identity verification request, a second identity verification response that is for the second identity verification request and that indicates verification success to the core network.

Understandably, in the scenario where the second identity verification request is not the retransmitted first identity verification request, the processing of the second identity verification request by the terminal is similar to the processing of the first identity verification request. For the specific processing process, refer to step 202 and this is not repeated herein.

In this way, there is no need to make any changes to the core network, the base station, and the USIM for user identity verification and authentication operations in the terminal. The core network performs identity verification with the terminal according to the normal process, and when the terminal receives the second identity verification request after the initial identity verification and authentication, the terminal compares the first identity verification request received during the initial identity verification with the second identity verification request, after determining that the second identity verification and authentication fails, the terminal monitors a direction of the call service within the timing duration corresponding to the T3320 timer, and when it is determined that the call service is redirected to success, the terminal automatically stops the T3320 timer to prevent the terminal from automatically executing the call drop process after the T3320 timer expires, thereby effectively avoiding misjudgment in the identity verification and authentication stage, and solving the problem of a call drop caused by misjudgment in the identity verification and authentication stage in existing user scenarios, which reduces the call drop rate and improves user experience.

To better understand the call drop rate reduction method provided by this embodiment, specific interactions of the core network, the base station, the terminal, and the USIM in the terminal when the terminal implements the call drop rate reduction method provided by this embodiment are described in conjunction with FIG. 5 below.

Step 301: When the terminal calls a core network CN using a CSFB technology or an SRVCC technology, the base station first sends a terminal capability query request to the terminal to obtain terminal capability information.

Understandably, in an actual application scenario, the terminal needs to establish a communication link with the base station, and receive and transmit, through an antenna, electromagnetic wave signals transmitted in the communication link.

Step 302: The terminal obtains terminal capability information of the terminal in response to the received terminal capability query request from the base station, for example, a plurality of terminal capability information SEG, and continuously reports the obtained terminal capability information SEG to the base station, for example, terminal capability information SEG-1 to terminal capability information SEG-N in FIG. 5.

Exemplarily, in an example, if there are five pieces of terminal capability information SEGs of the terminal obtained by the terminal, that is, SEG-1, SEG-2, SEG-3, SEG-4, and SEG-5, these five pieces of terminal capability information are added to the message sending queue in sequence, and sent to the base station in sequence according to the order in which the information enters the queue. For example, SEG-1 is sent to the base station at time T1, SEG-2 is sent to the base station at time T2, SEG-3 is sent to the base station at time T3, SEG-4 is sent to the base station at time T4, and SEG-5 is sent to the base station at time T5.

Step 303: When the terminal sends the terminal capability information SEG to the base station, the core network sends a first identity verification request to the terminal through the base station.

It can be seen from the description of the foregoing embodiments that specifically the terminal receives the first identity verification request through an antenna.

In addition, based on the stipulations of the 3GPP proto-col, after the core network sends the first identity verification request to the terminal through the base station, the core network starts the T3360 timer and sets the corresponding timing duration.

Step 304: The terminal sends the first identity verification request to the USIM set in the terminal.

It can be seen from the description of the above embodi-ment that specifically the modem associated with the USIM sends the first identity verification request received by the antenna to the associated USIM, so that the USIM can perform identity verification and authentication processing according to the received first identity verification request.

Step 305: In response to the first identity verification request, the USIM makes a first identity verification response that indicates verification success for the first identity verification request, and sends the first identity verification response to the terminal.

It can be seen from the description of the foregoing embodiments that the first identity verification response is specifically sent to the terminal through the modem associ-ated with the USIM.

Step 306: The terminal sends the first identity verification response that indicates verification success to the base station, so that the base station sends the first identity verification response to the core network.

Exemplarily, if three pieces of terminal capability infor-mation SEGs SEG-3, SEG-4, and SEG-5 in the message sending queue have not been sent to the base station when the terminal sends the first identity verification response to the base station, the first identity verification response that indicates verification success needs to be added to the message queue, and can be sent only after the three pieces of terminal capability information SEGs are all sent to the base station. For example, the first identity verification response that indicates verification success can be sent only at time T6.

If the end time of the timing duration corresponding to the T3360 timer started by the core network is T5, that is, the T3360 timer has expired before the first identity verification response that indicates verification success arrives at the core network, the core network triggers a flow of retrans-mission of the identity verification request, that is, perform step 307.

Step 307: The core network sends a second identity verification request to the terminal through the base station.

It should be noted that in the current scenario, for the convenience of description, it is specified that the second identity verification request sent by the core network after the T3360 timer expires is the retransmitted first identity verification request, that is, the first identity verification request and the second authentication request received by the terminal are exactly the same.

Step 308: The terminal sends the second identity verifi-cation request to the USIM set in the terminal.

It can be seen from the description of the above embodi-ment that specifically the modem associated with the USIM sends the second identity verification request received by the antenna to the associated USIM, so that the USIM can perform identity verification and authentication processing according to the received second identity verification request.

In addition, it should be noted that, for the applicable scenario of this embodiment, the identity verification request retransmitted by the core network must be for the call service of the same USIM. Therefore, the second identity verification request received by the antenna is transmitted to the same USIM by the modem that forwards the first identity verification request.

Step 309: In response to the second identity verification request, the USIM makes a second identity verification response that indicates verification failure for the second identity verification request, and sends the second identity verification response to the terminal.

It can be seen from the description of the foregoing embodiments that the second identity verification response is specifically sent to the terminal through the modem associated with the USIM.

In addition, it can be seen from the description of the above embodiments that the USIM compares the received second identity verification request with the first identity verification request, and then determines whether the two identity verification requests are the same, so as to provide an appropriate authentication result.

It is understandable that since the first identity verification request and the second identity verification request are the same, and the USIM has made the first identity verification response that indicates verification success for the first identity verification request, and receives the second identity verification request that is the same as the first identity verification request, the USIM mistakenly considers that identity verification and authentication with the core net-work fails. Therefore, the second identity verification response made for the second identity verification request is a second identity verification response that indicates verifi-cation failure.

Specifically, according to the stipulations of the 3GPP protocol, when the USIM mistakenly considers based on the above scenario that identity verification and authentication with the core network fails, the cause value of the verifica-tion failure carried in the made second identity verification response that indicates verification failure is specifically synch failure.

Step 310: The terminal sends the second identity verifi-cation response that indicates verification failure to the base station, so that the base station sends the second identity verification response to the core network.

Exemplarily, if there is still terminal capability informa-tion such as SEG-5 and the first identity verification response in the message sending queue that has not been sent to the base station when the terminal sends the second identity verification response to the base station, the second identity verification response that indicates verification fail-ure needs to be added to the message queue, and can be sent only after SEG-5 and the first identity verification response are all sent to the base station. For example, the second identity verification response that indicates verification fail-ure can be sent only at time T7. In this way, before receiving the second identity verification response that indicates veri-fication failure, the core network first receives the first identity verification response that indicates verification suc-cess. Since the first identity verification request and the second identity verification request are exactly the same, the core network mistakenly considers that the currently received first identity verification response is made by the terminal in response to the second identity verification request. Besides, because the authentication result of the first identity verification response is verification success, the core network considers that the identity verification and authentication with the terminal is successful and continues to perform the call service, and the second identity verification response received after the first identity verification response is ignored by the core network, that is, the core network does not re-initiate the identity verification request according to the second identity verification response.

In addition, as can be known based on the stipulations of the 3GPP protocol, after the terminal sends the second identity verification response that indicates verification failure and that has synch failure as the cause value to the core network through base station, the terminal starts the T3320 timer and sets a corresponding timing duration and waits for the core network to re-initiate the identity verification request within the set timing duration. If the core network does not re-initiate the identity verification request within the time duration corresponding to the T3320 timer, the call drop process is automatically triggered after the T3320 timer expires.

Therefore, after the terminal sends the second identity verification response to the base station and starts the T3320 timer, the terminal monitors within the timing duration whether the terminal has received a retransmitted identity verification request sent by the core network through the base station, or directly monitors direction information of the currently executed call service, and determines, according to the direction information, whether the call service is redirected to success, that is, performs step 311.

Step 311: When the terminal detects within the timing duration corresponding to the T3320 timer that the currently executed call service is redirected to success, the terminal actively stops the T3320 timer.

For details on how to determine, according to the direction information, whether the call service is redirected to success, refer to the description of step 207 in the above embodiment, and details will not be repeated herein.

Thus, through the interaction process between the USIM, the terminal, the base station and the core network, the call drop problem existing in the identity verification and authentication stage is solved.

It should be understood that the above description is only an example for better understanding of the technical solution of this embodiment, and is not the only limitation to this embodiment.

Figure 6:
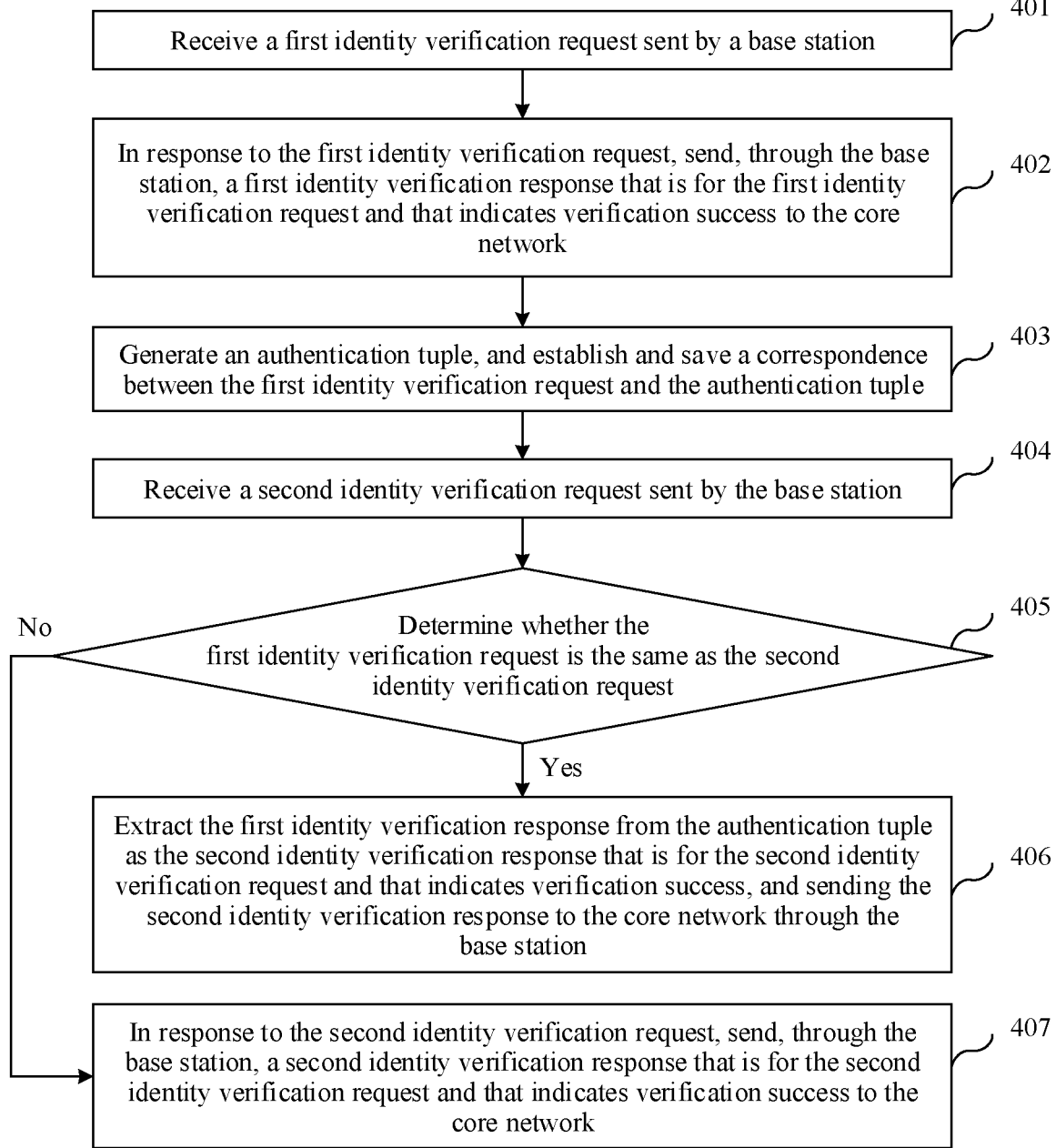
FIG. 6 is a schematic flowchart 2 of an exemplary call drop rate reduction method according to an embodiment of this application.

Referring to FIG. 6, a specific implementation of another call drop rate reduction method provided by the embodiments of this application, specifically includes:

Step 401: Receive a first identity verification request sent by a base station.

Step 402: In response to the first identity verification request, send, through the base station, a first identity verification response that is for the first identity verification request and that indicates verification success to the core network.

The steps 401 and 402 in this embodiment are roughly the same as the steps 201 and 202 in the embodiment shown in FIG. 4. The specific implementation process of steps 401 and 402 is detailed in steps 201 and 202, and will not be repeated herein.

Step 403: Generate an authentication tuple, and establish and store a correspondence between the first identity verification request and the authentication tuple.

Specifically, the authentication tuple generated in this embodiment is for the purpose of directly reusing, for the subsequently retransmitted identity verification request, the identity verification response that the USIM has made, without repeated processing by the USIM, so as to avoid that when the USIM receives the same two identity verification requests, the USIM mistakenly considers that the identity verification and authentication with the core network fails, and then makes the second identity verification response whose cause value of verification failure is synch failure, and starts the T3320 timer, resulting in that the call drop process is triggered when no identity verification request retransmitted by the core network is subsequently received within the timing duration corresponding to the T3320 timer.

Based on this, to facilitate the terminal to quickly and accurately find a reusable identity verification response from the authentication tuple when the terminal receives the second identity verification request and determines that the second identity verification request is the same as the first identity verification request, in this embodiment, the generated authentication tuple needs to include the first identity verification request and the first identity verification response that indicates verification success and that is for the first identity verification request.

Further, in order to ensure that the first identity verification request and the second identity verification request are for the same session, it is also necessary to include the session identification number of the call service corresponding to the first identity verification request.

Further, considering that in practical applications, the time interval between the retransmitted identity verification request and the previous identity verification request are not excessively large, the interval between the two identity verification requests also needs to be considered. Therefore, the authentication tuple also needs to include the system time when the first identity verification request is received.

Based on the above four pieces of specific parameter information, when generating an authentication tuple, the specific process is as follows:

(1) Determine the system time when the first identity verification request is received, to obtain the first moment.

(2) Obtain a session identification number of a call service corresponding to the first identity verification request.

It can be understood that the session identification number mentioned in this embodiment, that is, the session ID often referred to in the communication field, is a read-only value that uniquely identifies the current access session. Normally, session IDs are allocated sequentially, that is, session ID "706616433" is followed by session ID "706616434", so that it is possible to distinguish whether two authentication requests are the same.

In addition, with regard to the above steps (1) and (2), the order is not limited in practical applications.

(3) Generate an authentication tuple according to the first identity verification request, the first identity verification response, the session identification number, and the first moment.

Exemplarily, in this embodiment, the first identity verification request recorded in the authentication tuple includes a random number and an authentication value; where the authentication value is calculated based on the random number.

The USIM in the terminal needs to use the authentication value in the first identity verification request when performing identity verification and authentication on the first identity verification request, and the authentication value is calculated based on the random number, so that different identity verification requests can be distinguished. Therefore, in the embodiments of this application, the first identity verification request required for generating the authentication tuple includes a random number and an authentication value.

Exemplarily, in this embodiment, the first identity verification response recorded in the authentication tuple includes an A&C reference number, an actual response value, and an expected response value.

In an actual application scenario, authentication tuples corresponding to a plurality of different identity verification requests may be stored in the terminal. Therefore, to facilitate finding the first identity verification response that can be reused for the second identity verification request, in the embodiments of this application, the first identity verification response required for generating the authentication tuple includes the reference number that can identify the response, the actual response value calculated according to the message in the first identity verification request, and the expected response value expected by the core network, so as to facilitate determining whether the current authentication is successful.

(4) establishing and saving a correspondence between the first identity verification request and the authentication tuple.

It should be understood that the above description is only an example for better understanding of the technical solution of this embodiment, and is not the only limitation to this embodiment. In actual application scenarios, other field information may be added to the authentication tuple according to service requirements.

Step 404: Receive a second identity verification request sent by the base station.

Specifically, step 404 in this embodiment is substantially the same as step 203 in the embodiment shown in FIG. 4, and the specific implementation process of step 404 can be found in step 203, and will not be repeated herein.

Step 405: Determine whether the first identity verification request is the same as the second identity verification request.

Specifically, in the scenario where the authentication tuple is introduced, that is, for the same two authentication requests, if the requirement is met, the retransmitted authentication request can directly reuse the authentication response stored in the authentication tuple, the operation of determining whether the first identity verification request is the same as the second identity verification request is specifically completed by the terminal, that is, in this embodiment, the USIM does not process the retransmitted identity verification request. Therefore, after receiving the second identity verification request, the terminal respectively determines a system time when the first identity verification request is received and a system time when the second identity verification request is received, to obtain a first moment and a second moment; and then determines whether a time interval between the first moment and the second moment is less than a time threshold.

Correspondingly, when the time interval is less than the time threshold, the terminal continues to determine whether content of the first identity verification request is consistent with content of the second identity verification request; for example, can perform determining by comparing serial numbers that can identify the identity verification requests.

Correspondingly, when the content of the first identity verification request is consistent with the content of the second identity verification request, the terminal respectively obtains the session identification number of the call service corresponding to the first identity verification request and the session identification number of the call service corresponding to the second identity verification request, and then continues to determine whether the session identification number of the call service corresponding to the first identity verification request is the same as the session identification number of the call service corresponding to the second identity verification request.

Correspondingly, when the session identification number of the call service corresponding to the first identity verification request is the same as the session identification number of the call service corresponding to the second identity verification request, it is determined that the first identity verification request is the same as the second identity verification request.

It should be understood that the above description is only an example for better understanding of the technical solution of this embodiment, and is not the only limitation to this embodiment. In actual application scenarios, different determining conditions can be set according to actual service requirements, and there is no limitation herein.

Therefore, in step 405, if it is determined that the first identity verification request and the second identity verification request are the same, perform step 406; otherwise, perform step 407.

Step 406: Extract the first identity verification response from the authentication tuple as the second identity verification response that is for the second identity verification request and that indicates verification success, and sending the second identity verification response to the core network through the base station.

That is, the identity verification response recorded in the authentication tuple is directly reused without the USIM processing the second identity verification request, so that the second identity verification response that indicates verification failure is not regretted, and the terminal is not allowed to start the T3320 timer.

Correspondingly, if the T3320 timer is not started, there is no operation of triggering the call drop process after the T3320 timer expires, that is, in this scenario where the identity verification response recorded in the authentication tuple can be reused, the solution for reducing the call drop rate provided by the embodiment directly does not trigger the call drop process, thereby avoiding the call drop problem, greatly reducing the call drop rate, and improving user experience.

Step 407: Send, through the base station in response to the second identity verification request, a second identity verification response that is for the second identity verification request and that indicates verification success to the core network.

Specifically, step 407 in this embodiment is substantially the same as step 210 in the embodiment shown in FIG. 4, and the specific implementation process of step 407 can be found in step 210, and will not be repeated herein.

In this way, after obtaining the first identity verification response that is for the first identity verification request and that indicates verification success, data related to the first identity verification request, such as the first identity verification response, the first moment when the first identity verification request is received, and the session identification number of the call service corresponding to the first identity verification request, is obtained, and then an authentication tuple is generated and stored based on the data. In this way, when the second identity verification request that is the same as the first identity verification request and retransmitted by the core network through the base station is subsequently received, the first identity verification response recorded in the authentication tuple can be directly reused. This avoids that the USIM mistakenly believes that synchronization of the core network is abnormal, that is, the SQN is out of range, and thus returns the second identity verification response that indicates authentication failure, causing the terminal to trigger the call drop process.

That is, when receiving the second identity verification request that is the same as the first identity verification request, the terminal first checks whether the stored authentication tuple can be reused for the second identity verification request, and then determines, based on the result, whether the existing authentication tuple is directly reused or the USIM performs the identity authentication and authentication operation in response to the second authentication request again, thereby preventing the USIM from returning authentication failure, thereby preventing the execution of the call drop process from the source and effectively reducing the call drop rate.

To better understand the call drop rate reduction method provided by this embodiment, specific interactions of the core network, the base station, the terminal, and the USIM in the terminal when the terminal implements the call drop rate reduction method provided by this embodiment are described in conjunction with FIG. 7 below.

Step 501: When the terminal calls a core network CN using a CSFB technology or an SRVCC technology, the base station first sends a terminal capability query request to the terminal to obtain terminal capability information.

Step 502: The terminal obtains terminal capability information of the terminal in response to the received terminal capability query request from the base station, for example, a plurality of terminal capability information SEG, and continuously reports the obtained terminal capability information SEG to the base station, for example, terminal capability information SEG-1 to terminal capability information SEG-N in FIG. 7.

Step 503: When the terminal sends the terminal capability information SEG to the base station, the core network sends a first identity verification request to the terminal through the base station.

Step 504: The terminal sends the first identity verification request to the USIM set in the terminal.

Step 505: In response to the first identity verification request, the USIM makes a first identity verification response that indicates verification success for the first identity verification request, and sends the first identity verification response to the terminal.

Step 506: The terminal sends the first identity verification response that indicates verification success to the base station, so that the base station sends the first identity verification response to the core network.

Figure 7:
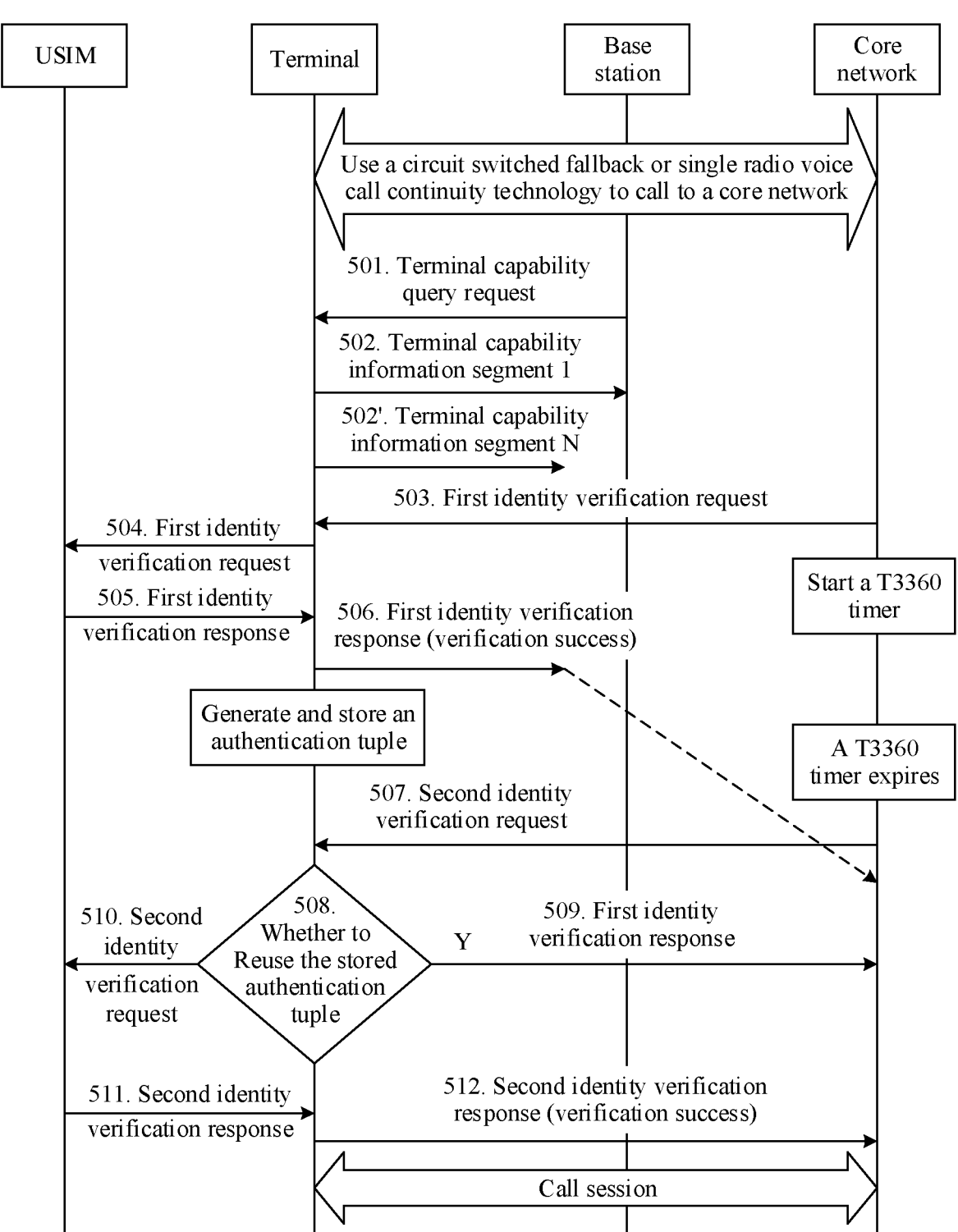
FIG. 7 is a sequence diagram of an exemplary interaction process between entities involved in implementation of the call drop rate reduction method provided in FIG. 6.

Referring to FIG. 7, it can be seen that the difference in this scenario is that after the terminal sends the first identity verification response that indicates verification success to the base station, the terminal generates and stores an authentication tuple corresponding to the first identity verification request for subsequent reuse.

For the manner of generating and saving the authentication tuple, refer to the description of step 403 in the embodiment shown in FIG. 6 above, and details will not be repeated herein.

Step 507: The core network sends a second identity verification request to the terminal through the base station.

Figure 5:
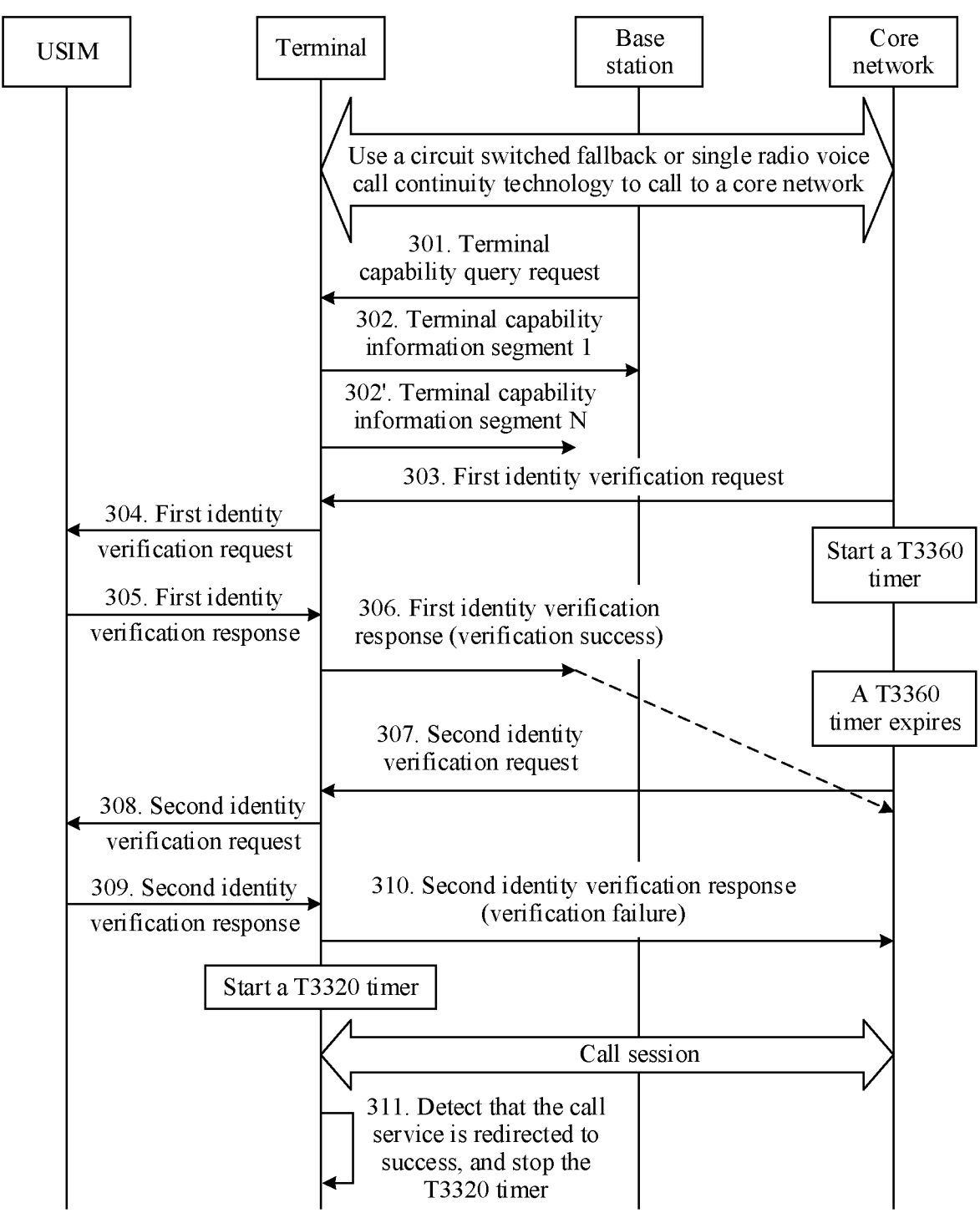
FIG. 5 is a sequence diagram of an exemplary interaction process between entities involved in implementation of the call drop rate reduction method provided in FIG. 4.

It is not difficult to find that steps 501 to 507 in the specific scenario description shown in FIG. 7 are substantially the same as steps 301 to 307 in the specific scenario description shown in FIG. 5, and will not be repeated herein.

Step 508: The terminal determines whether to reuse the stored authentication tuple.

Specifically, it can be seen from the description of the embodiment shown in FIG. 6 above that after receiving the second identity verification request, the terminal needs to first determine whether the first identity verification request is the same as the second identity verification request, and when determining that the first identity verification request is the same as the second identity verification request, determine whether there is an authentication tuple corresponding to the first identity verification request. For the specific determining process, refer to the description of step 405 and step 406 in the above-mentioned embodiment, and will not be repeated herein.

That is, if it is determined that the stored authentication tuple can be reused, perform step 509; otherwise, it means that the first identity verification request and the second identity verification request are different, and perform step 510, that is, a new identity verification and authentication operation is triggered.

Step 509: The terminal extracts the first identity verification response from the authentication tuple as the second identity verification response that is for the second identity verification request and that indicates verification success, and sends the second identity verification response to the core network through the base station.

That is, in this case, what the terminal sends to the core network through the base station is the first identity verification response that indicates verification success.

Correspondingly, since the first identity verification response that indicates verification success is sent, the terminal does not start the T3320 timer, so that the call drop process will not be triggered.

Step 510: The terminal sends the second identity verification request to the USIM set in the terminal.

Step 511: In response to the second identity verification request, the USIM makes a second identity verification response that indicates verification success for the second identity verification request, and sends the second identity verification response to the terminal.

Step 512: The terminal sends the second identity verification response that indicates verification success to the base station, so that the base station sends the second identity verification response to the core network.

It is not difficult to find that steps 510 to 512 in the specific scenario description shown in FIG. 7 are roughly the same as steps 308 to 310 in the specific scenario description shown in FIG. 5, except that in the scenario shown in FIG. 7, the second identity verification response made by the USIM for the second identity verification request is a second identity verification response that indicates verification success. Therefore, what the terminal sends to the core network through the base station is also the second identity response that indicates verification success, so that the identity verification and authentication between the core network and the terminal can be successful, and the call service can be carried out normally, thereby avoiding the problem of a call drop in the identity verification and authentication stage.

In addition, it can be understood that the essence of steps 510 to 512 is the interaction between the USIM, the terminal, the base station, and the core network when the first identity verification request and the second identity verification request are different. In this scenario, the subsequently established session is for the second identity response.

Thus, through the interaction process between the USIM, the terminal, the base station and the core network, the call drop problem existing in the identity verification and authentication stage is solved.

It should be understood that the above description is only an example for better understanding of the technical solution of this embodiment, and is not the only limitation to this embodiment.

Figure 8A:
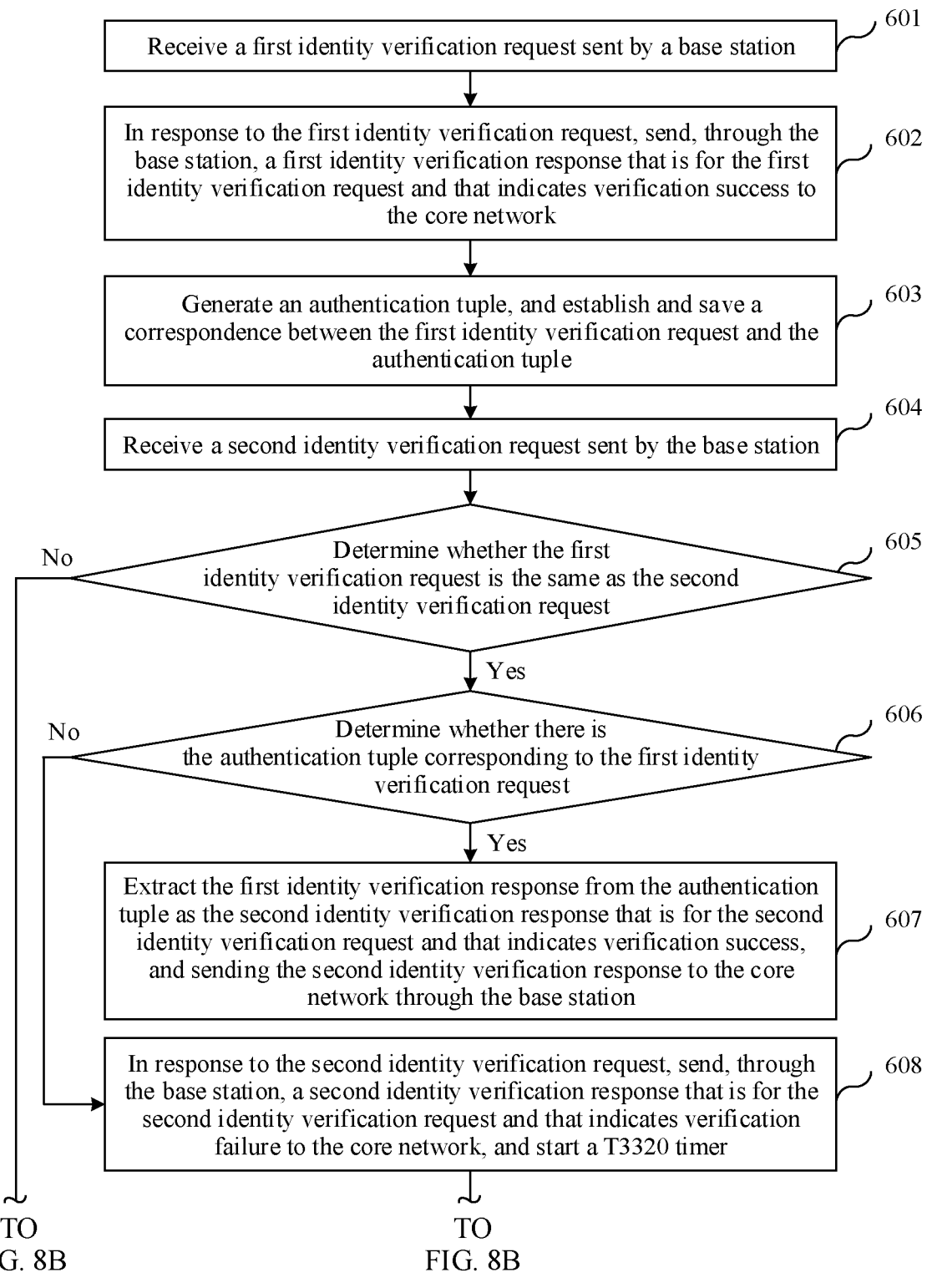
FIG. 8A and FIG. 8B are a schematic flowchart 3 of an exemplary call drop rate reduction method according to an embodiment of this application.
Figure 8B:
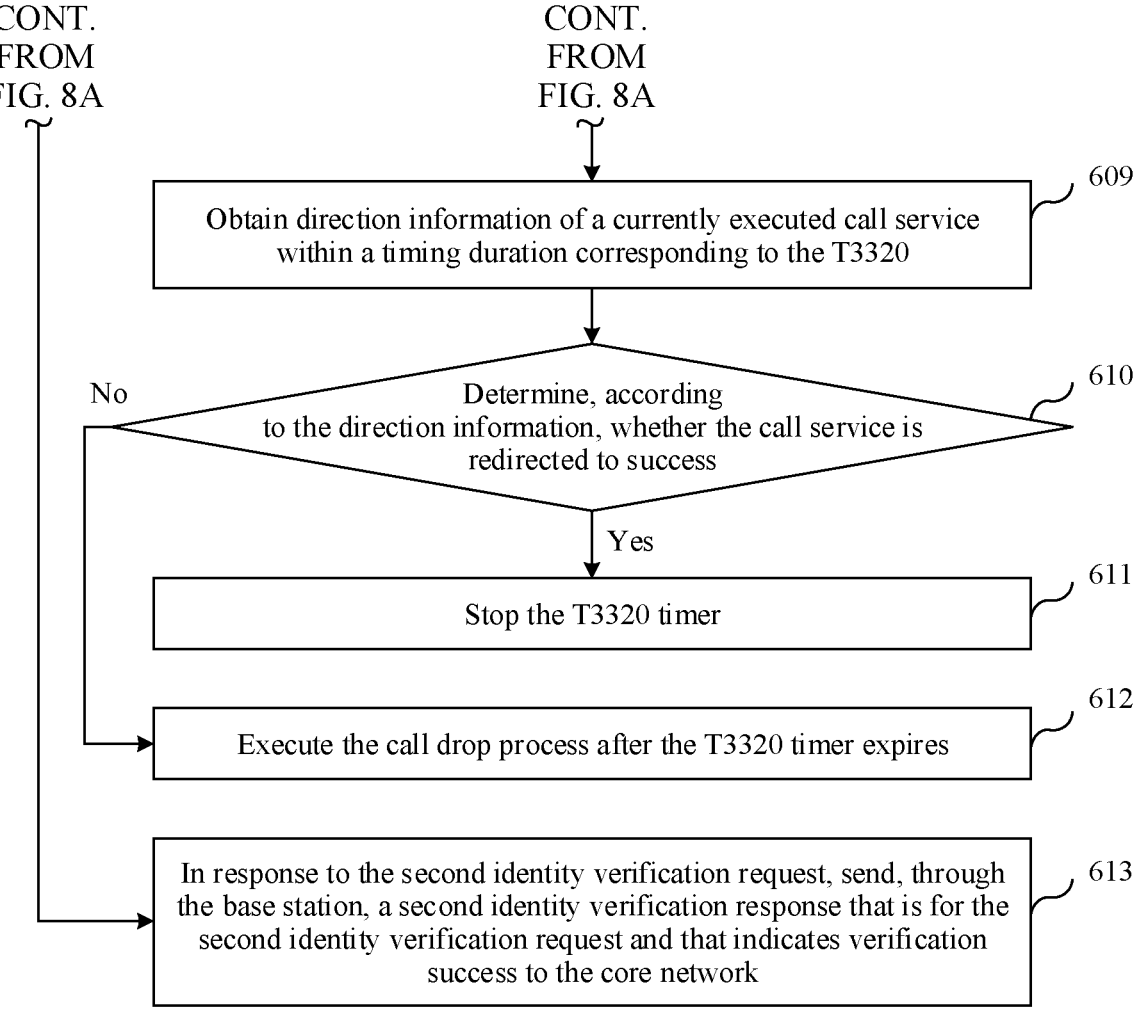

Referring to FIG. 8A and FIG. 8B, in another specific implementation of the call drop rate reduction method provided by the embodiments of this application, this embodiment specifically combines the above two implementations, so that the identity verification and authentication stage can use the call drop rate reduction method in the embodiment shown in FIG. 4, or the call drop rate reduction method in the embodiment shown in FIG. 6.

Step 601: Receive a first identity verification request sent by a base station.

Step 602: In response to the first identity verification request, send, through the base station, a first identity verification response that is for the first identity verification request and that indicates verification success to the core network.

The steps 601 and 602 in this embodiment are roughly the same as the steps 201 and 202 in the embodiment shown in FIG. 4. The specific implementation process of steps 601 and 602 is detailed in steps 201 and 202, and will not be repeated herein.

Step 603: Generate an authentication tuple, and establish and store a correspondence between the first identity verification request and the authentication tuple.

Specifically, step 603 in this embodiment is substantially the same as step 403 in the embodiment shown in FIG. 6, and the specific implementation process of step 603 can be found in step 403, and will not be repeated herein.

Step 604: Receive a second identity verification request sent by the base station.

Step 605: Determine whether the first identity verification request is the same as the second identity verification request.

The steps 603 and 604 in this embodiment are roughly the same as the steps 403 and 404 in the embodiment shown in FIG. 6. The specific implementation process of steps 603 and 604 is detailed in steps 403 and 404, and will not be repeated herein.

Step 606: Determine whether there is the authentication tuple corresponding to the first identity verification request.

Specifically, if it is determined that there is an authentication tuple corresponding to the first identity verification request, perform step 607; otherwise, perform step 608.

Exemplarily, in an actual application scenario, when the terminal generates and stores the authentication tuple, due to some abnormalities, the generated authentication tuple may not be stored in a specified location. Therefore, when the second identity verification request and the first identity verification request are the same, the operation in step 606 may be to query, according to the second identity verification request, whether there is a corresponding authentication tuple.

Step 607: Extract the first identity verification response from the authentication tuple as the second identity verification response that is for the second identity verification request and that indicates verification success, and sending the second identity verification response to the core network through the base station.

Specifically, step 607 in this embodiment is substantially the same as step 406 in the embodiment shown in FIG. 6, and the specific implementation process of step 607 can be found in step 406, and will not be repeated herein.

Step 608: Send, through the base station in response to the second identity verification request, a second identity verification response that is for the second identity verification request and that indicates verification failure to the core network, and start a T3320 timer.

Step 609: Obtain direction information of a currently executed call service within a timing duration corresponding to the T3320 timer.

Step 610: Determine, according to the direction information, whether the call service is redirected to success.

Step 611: Stop the T3320 timer.

Step 612: Execute the call drop process after the T3320 timer expires.

Step 613: Send, through the base station in response to the second identity verification request, a second identity verification response that is for the second identity verification request and that indicates verification success to the core network.

The steps 608 to 613 in this embodiment are roughly the same as the steps 205 to 210 in the embodiment shown in FIG. 4. The specific implementation process of steps 608 to 613 is detailed in steps 205 to 210, and will not be repeated herein.

For the effect that this embodiment can achieve, refer to the effective effect of the call drop rate reduction method provided by the embodiment shown in FIG. 4 and FIG. 5, and the effective effect of the call drop rate reduction method provided by the embodiment shown in FIG. 6 and FIG. 7 will not be repeated herein.

In addition, it should be noted that the call drop rate reduction method performed by the terminal provided in the above embodiments can also be performed by a system-on-a-chip included in the terminal, such as a USIM (or SIM) with a processing unit. The chip system may include a processor. The system-on-a-chip can be coupled with a memory, so that the system-on-a-chip invokes a computer program stored in the memory when running, so as to realize the above-mentioned steps executed by the terminal.

In addition, it should be noted that the processor in the system-on-a-chip may be an application processor or a non-application processor.

In addition, the embodiments of this application also provide a computer-readable storage medium, which stores computer instructions, and when the computer instructions are run on the terminal, the terminal is caused to execute the steps of the above-mentioned related methods to realize the call drop rate reduction method applied to a terminal in the above-mentioned embodiments.

In addition, an embodiment of this application also provides a computer program product, where when running on a computer, the computer program product causes the computer to execute the above related steps, so as to implement the call drop rate reduction method applied to the terminal in the above embodiment.

In addition, an embodiment of this application also provides a call drop rate reduction system. The system includes a base station, a core network, and a terminal for implementing the call drop rate reduction method in the foregoing embodiments.

In addition, an embodiment of this application also provides a chip (which may also be a component or a module), which may include one or more processing circuits and one or more transceiver pins; where the transceiver pins and the processing circuits communicate with each other through an internal connection path, and the processing circuit executes the related method steps to perform the call drop rate reduction method in the foregoing embodiment, to control a receiving pin to receive a signal and to control a sending pin to send a signal.

From the above description of the hardware structure of the terminal, it can be seen that the terminal includes but is not limited to: at least one USIM, a modem associated with the at least one USIM, one or more processors, memories, and one or more computer programs.

One or more computer programs are stored in the memory, and when the computer programs are executed by one or more processors, the terminal or the chip system can be caused to execute the steps in any of the above method embodiments.

Since the above-mentioned steps performed by the terminal to switch the wireless communication mode are similar to the call drop rate reduction method described in the above-mentioned method embodiment, for the specific details not described herein, refer to description of the method embodiments, ad details will not be repeated herein.

In addition, it can be seen from the above description that the terminal, the computer-readable storage medium, the computer program product, or the chip provided in the embodiments of this application are all configured to perform the corresponding call drop rate reduction method provided above. Therefore, for beneficial effects that can be achieved, refer to the beneficial effects of the corresponding method provided above. Details are not described herein again.

In addition, it should be understood that the foregoing embodiments are merely used to describe the technical solutions of this application, instead of limiting the technical solutions of this application. Although this application is described in detail with reference to the foregoing embodiments, a person of ordinary skill in the art should understand that the technical solutions recorded in the foregoing embodiments may still be modified, or equivalently replace some technical features. However, these modifications or replacements do not make the essence of the corresponding technical solutions go beyond the scope of the technical solutions of the embodiments of this application.

What is claimed is:

1. A method, comprising:

receiving a first identity verification request from a base station, wherein the first identity verification request is initiated by a core network, and wherein a T3360 timer is started by the core network after the base station receives the first identity verification request from the core network;

sending, through the base station in response to the first identity verification request, a first identity verification response for the first identity verification request that indicates verification success to the core network;

receiving a second identity verification request from the base station, wherein the second identity verification request is initiated by the core network after a timing duration corresponding to the T3360 timer expires;

sending, through the base station in response to the second identity verification request when the first identity verification request is the same as the second identity verification request, a second identity verification response for the second identity verification request and that indicates verification failure to the core network, and starting a T3320 timer;

obtaining direction information of a currently executed call service within a timing duration corresponding to the T3320 timer, wherein the call service is associated with the first identity verification request and the second identity verification request; and stopping the T3320 timer when the call service is redirected to success, wherein whether the call service is redirected to success is based on the direction information.

2. The method according to of claim 1, wherein after sending the first identity verification response that indicates verification success to the core network, the method further comprises:

obtaining a session identification number of a call service corresponding to the first identity verification request;

generating an authentication tuple according to the first identity verification request, the first identity verification response, the session identification number, and a first moment, wherein the first moment is based on a system time when the first identity verification request is received; and establishing and saving a correspondence between the first identity verification request and the authentication tuple.

3. The method of claim 2, wherein the first identity verification request recorded in the authentication tuple comprises a random number and an authentication value, and wherein the authentication value is calculated based on the random number.

4. The method of claim 2, wherein the first identity verification response recorded in the authentication tuple comprises an A&C reference number, an actual response value, and an expected response value.

5. The method of claim 2, wherein when there is an authentication tuple corresponding to the first identity verification request, before sending, the second identity verification response d that indicates verification failure to the core network, and starting the T3320 timer, the method further comprises extracting the first identity verification response from the authentication tuple as the second identity verification response that indicates verification success, and sending the second identity verification response to the core network through the base station, and wherein when there is no authentication tuple corresponding to the first identity verification request, the method further comprises sending, through the base station in response to the second identity verification request, a second identity verification response that is for the second identity verification request that indicates verification failure to the core network, and starting the T3320 timer.

6. The method of claim 1, wherein receiving the first identity verification request and sending the first identity verification response that indicates verification success to the core network comprises:

receiving, through an antenna, the first identity verification request from the base station;

sending the first identity verification request to a first universal subscriber identity module (USIM) through a modem associated with the first USIM, wherein the first USIM is for processing the first identity verification request;

sending, by the first USIM in response to the first identity verification request, the first identity verification response first that indicates verification success to the modem; and sending, by the modem, the first identity verification response that indicates verification success to the base station through the antenna, wherein the base station sends the first identity verification response that indicates verification success to the core network.

7. The method of claim 6, wherein the method is applied to a terminal including two USIMs, and wherein whether the first identity verification request is the same as the second identity verification request comprises:

receiving, through an antenna, the second identity verification request from the base station;

sending the second identity verification request to a second USIM through a modem associated with the second USIM, wherein the second USIM is for processing the second identity verification request, wherein when the first USIM and the second USIM are a same USIM, the method comprises determining, by the first USIM, whether the first identity verification request is the same as the second identity verification request, wherein when the first USIM and the second USIM are different USIMs, the method comprises:

sending, by the second USIM in response to the second identity verification request, the second identity verification response that indicates verification success to the modem associated with the second USIM; and sending, by the modem associated with the second USIM, the second identity verification response that indicates verification success to the base station through the antenna, wherein the base station sends the second identity verification response that indicates verification success to the core network.

8. The method of claim 7, wherein a first moment corresponds to a system time when the first identity verification request is received, and a second moment corresponds to a system time when the second identity verification request is received, and wherein the first identity verification request is the same as the second identity verification request when a time interval between the first moment and the second moment is less than a time threshold, when content of the first identity verification request is consistent with content of the second identity verification request, and when an obtained session identification number of a call service corresponding to the first identity verification request is the same as an obtained session identification number of a call service corresponding to the second identity verification request.

9. The method of claim 8, wherein for different identity verification requests, a first serial number corresponding to the first identity verification request is different than a second serial number corresponding to the second identity verification request, and wherein the content of the first identity verification request is consistent with content of the second identity verification request.

10. The method of claim 7, wherein sending, through the base station in response to the second identity verification request, the second identity verification response that indicates verification failure to the core network, and starting the T3320 timer further comprises:

generating, by the first USIM in response to the second identity verification request, the second identity verification response including a cause of verification failure value that corresponds to a is synch failure;

sending, by the first USIM, the second identity verification response to the modem; and sending, by the modem, the second identity verification response that indicates verification failure to the base station through the antenna, wherein the base station sends the second identity verification response that indicates verification failure to the core network.

11. The method according to of claim 1, wherein the call service is redirected to success when the direction information is Routing Area Update Accept, or Service Accept, or connect, or connect act; and when the direction information is Routing Area Update Accept, or Service Accept, or connect, or connect act.

12. The method of claim 1, wherein after the when the first identity verification request is not the same as the second identity verification request, the method further comprises sending, through the base station in response to the second identity verification request, the second identity verification response that indicates verification success to the core network.

13. A terminal, comprising:

at least one universal subscriber identity module (USIM);

a modem associated with the at least one USIM;

one or more processors coupled to the modem and the USIM; and a memory coupled to the one or more processors and storing instructions that, when executed by the one or more processors, cause the terminal to be configured to:

receive a first identity verification request from a base station, wherein the first identity verification request is initiated by a core network, and wherein a T3360 timer is started by the core network after the core network sends the first identity verification request to the base station;

send, through the base station in response to the first identity verification request, a first identity verification response for the first identity verification request that indicates verification success to the core network;

receive a second identity verification request from the base station, wherein the second identity verification request is initiated by the core network after a timing duration corresponding to the T3360 timer expires;

send, through the base station in response to the second identity verification request when the first identity verification request is the same as the second identity verification request, a second identity verification response for the second identity verification request that indicates verification failure to the core network, and start a T3320 timer;

obtain direction information of a currently executed call service within a timing duration corresponding to the T3320 timer, wherein the call service is associated with the first identity verification request and the second identity verification request; and stop the T3320 timer when the call service is redirected to success, wherein whether the call service is redirected to success is based on the direction information.

14. A non-transitory computer-readable storage medium, comprising instructions that, when executed by one or more processors of a terminal, cause the terminal to be configured to:

receive a first identity verification request from a base station, wherein the first identity verification request is initiated by a core network, and wherein a T3360 timer is started by the core network after the core network sends the first identity verification request to the base station;

send, through the base station in response to the first identity verification request, a first identity verification response for the first identity verification request that indicates verification success to the core network;

receive a second identity verification request from the base station, wherein the second identity verification request is initiated by the core network after a timing duration corresponding to the T3360 timer expires;

send, through the base station in response to the second identity verification request when the first identity verification request is the same as the second identity verification request, a second identity verification response for the second identity verification request that indicates verification failure to the core network, and start a T3320 timer;

obtain direction information of a currently executed call service within a timing duration corresponding to the T3320 timer, wherein the call service is associated with the first identity verification request and the second identity verification request; and stop the T3320 timer when the call service is redirected to success, wherein whether the call service is redirected to success is based on the direction information.

15. A chip, comprising:

one or more processing circuits; and one or more transceiver pins, wherein the transceiver pins and the processing circuits communicate with each other through an internal connection path, and the one or more processing circuits execute the method of claim 1, to control a receiving pin to receive a signal and to control a sending pin to send a signal.

16. The terminal of claim 13, wherein after sending the first identity verification response that indicates verification success to the core network, the instructions, when executed by the one or more processors, further cause the terminal to be configured to:

obtain a session identification number of a call service corresponding to the first identity verification request;

generate an authentication tuple according to the first identity verification request, the first identity verification response, the session identification number, and a first moment, wherein the first moment is based on a system time when the first identity verification request is received; and establish and save a correspondence between the first identity verification request and the authentication tuple, wherein when there is an authentication tuple corresponding to the first identity verification request, before sending the second identity verification response that indicates verification failure to the core network, and starting the T3320 timer, the instructions, when executed by the one or more processors, further cause the terminal to be configured to extract the first identity verification response from the authentication tuple as the second identity verification response that indicates verification success, and send the second identity verification response to the core network through the base station, and wherein when there is no authentication tuple corresponding to the first identity verification request, the instructions, when executed by the one or more processors, further cause the terminal to be configured to send, through the base station in response to the second identity verification request, a second identity verification response that indicates verification failure to the core network, and start the T3320 timer.

17. The terminal of claim 13, wherein a first moment corresponds to a system time when the first identity verification request is received, and a second moment corresponds to a system time when the second identity verification request is received, and wherein the first identity verification request is the same as the second identity verification request when a time interval between the first moment and the second moment is less than a time threshold, when content of the first identity verification request is consistent with content of the second identity verification request, and when an obtained session identification number of a call service corresponding to the first identity verification request is the same as an obtained session identification number of a call service corresponding to the second identity verification request.

18. The terminal of claim 17, wherein for different identity verification requests, a first serial number corresponding to the first identity verification request is different than a second serial number corresponding to the second identity verification request, and wherein the content of the first identity verification request is consistent with content of the second identity verification request when the first serial number is the same as the second serial number.

19. The terminal of claim 13, wherein the call service is redirected to success when the direction information is Routing Area Update Accept, or Service Accept, or connect, or connect act.

20. The terminal of claim 13, wherein when the first identity verification request is not the same as the second identity verification request, the instructions, when executed by the one or more processors, further cause the terminal to be configured to send, through the base station in response to the second identity verification request, the second identity verification response that indicates verification success to the core network.

* * * * *